US012454300B2

(12) United States Patent
Harber et al.

(10) Patent No.: US 12,454,300 B2
(45) Date of Patent: Oct. 28, 2025

(54) COLLAPSIBLE MAINTENANCE CART

(71) Applicant: Abatement Technologies, Inc., Suwanee, GA (US)

(72) Inventors: Blair Lawrence Harber, St. Davids (CA); Adam Brian Hunninck, Stevensville (CA)

(73) Assignee: Abatement Technologies, Inc., Suwanee, GA (US)

(*) Notice: Subject to any disclaimer, the term of this patent is extended or adjusted under 35 U.S.C. 154(b) by 326 days.

(21) Appl. No.: 17/965,999

(22) Filed: Oct. 14, 2022

(65) Prior Publication Data

US 2023/0124405 A1    Apr. 20, 2023

Related U.S. Application Data

(60) Provisional application No. 63/257,750, filed on Oct. 20, 2021.

(51) Int. Cl.
*B62B 3/02* (2006.01)
*B62B 3/00* (2006.01)

(52) U.S. Cl.
CPC ............. *B62B 3/02* (2013.01); *B62B 3/003* (2013.01); *B62B 2205/006* (2013.01)

(58) Field of Classification Search
CPC .................................. B62B 3/02; B62B 3/003
See application file for complete search history.

(56) References Cited

U.S. PATENT DOCUMENTS

| | | | | |
|---|---|---|---|---|
| 2,553,659 | A * | 5/1951 | Lazell | B62B 3/02 280/641 |
| 3,498,628 | A * | 3/1970 | Ferneau | B62B 5/0003 280/659 |
| 4,948,077 | A * | 8/1990 | Gonzalez | B62B 3/02 280/DIG. 3 |
| 5,975,660 | A * | 11/1999 | Tisbo | A47B 47/045 312/265.2 |
| 6,024,223 | A * | 2/2000 | Ritter | B65D 19/18 206/386 |
| 6,238,029 | B1 * | 5/2001 | Marzec | H02B 1/565 312/265.5 |
| 6,409,293 | B1 * | 6/2002 | Chang | A47B 88/941 312/265.5 |
| 9,574,399 | B2 | 2/2017 | Harber et al. | |
| 9,687,080 | B1 * | 6/2017 | Thiel | A47C 9/02 |
| 10,195,979 | B2 | 2/2019 | Harber et al. | |
| 10,717,379 | B2 | 7/2020 | Harber et al. | |

(Continued)

FOREIGN PATENT DOCUMENTS

CA    2895016 C    5/2017

*Primary Examiner* — Erez Gurari
(74) *Attorney, Agent, or Firm* — Kilpatrick, Townsend & Stockton LLP

(57) ABSTRACT

A collapsible maintenance cart includes a lower structure and an upper structure that are movable between a stowed configuration and a working configuration. In the working configuration, the lower structure and the upper structure together define an interior workspace, and the upper structure is movable relative to the lower structure between a raised position and a lowered position. In the stowed configuration, a height of the collapsible maintenance cart in the stowed configuration is less than a height of the collapsible maintenance cart in the lowered position of the working configuration.

10 Claims, 31 Drawing Sheets

(56) References Cited

U.S. PATENT DOCUMENTS

| | | | |
|---|---|---|---|
| 10,881,040 B1* | 12/2020 | Herreid | B62B 5/00 |
| 11,192,490 B2 | 12/2021 | Harber et al. | |
| 11,542,061 B2* | 1/2023 | Shuert | B65D 19/38 |
| 12,179,823 B2* | 12/2024 | George | B62B 5/0495 |
| 2005/0077805 A1* | 4/2005 | Dalebout | A47B 47/0083 |
| | | | 312/249.11 |
| 2005/0140119 A1* | 6/2005 | Wong | B62B 3/027 |
| | | | 280/651 |
| 2005/0173878 A1* | 8/2005 | Espejo | B62B 3/027 |
| | | | 280/47.34 |
| 2008/0018078 A1* | 1/2008 | Van Landingham, Jr. | |
| | | | B62B 3/02 |
| | | | 280/30 |
| 2010/0032927 A1* | 2/2010 | Gordon | A47B 3/10 |
| | | | 280/659 |
| 2010/0059951 A1* | 3/2010 | Hadar | B65G 1/07 |
| | | | 108/57.33 |
| 2010/0320732 A1* | 12/2010 | Dobrachinski | B62B 3/027 |
| | | | 280/651 |
| 2014/0197168 A1* | 7/2014 | Miller | B65D 21/0215 |
| | | | 220/4.33 |
| 2015/0225005 A1* | 8/2015 | Chen | B62B 3/02 |
| | | | 280/42 |
| 2016/0016599 A1* | 1/2016 | Harber | E06C 1/125 |
| | | | 280/651 |
| 2016/0286955 A1* | 10/2016 | Cohen | A47B 31/04 |
| 2016/0332651 A1* | 11/2016 | Benning | B62B 3/003 |
| 2017/0313334 A1* | 11/2017 | Ryan | B65D 25/30 |
| 2021/0146984 A1* | 5/2021 | Baldridge | B62B 3/022 |
| 2021/0206412 A1* | 7/2021 | Lindström | B65D 19/42 |
| 2022/0063477 A1 | 3/2022 | Harber et al. | |
| 2023/0124405 A1* | 4/2023 | Harber | B62B 3/02 |
| | | | 280/651 |
| 2023/0347954 A1* | 11/2023 | Bibler | B62B 3/003 |
| 2024/0208558 A1* | 6/2024 | George | B62B 3/02 |

\* cited by examiner

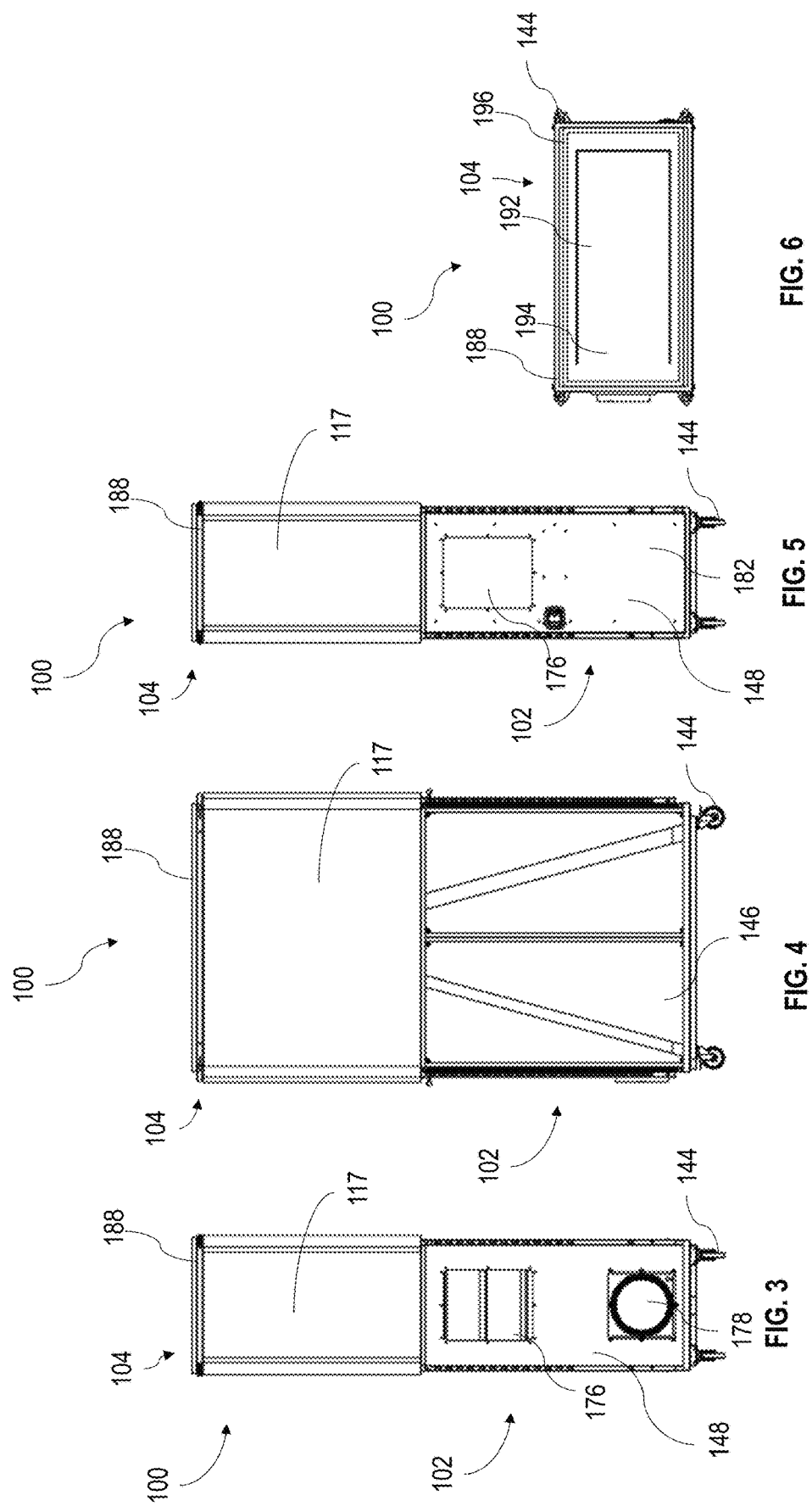

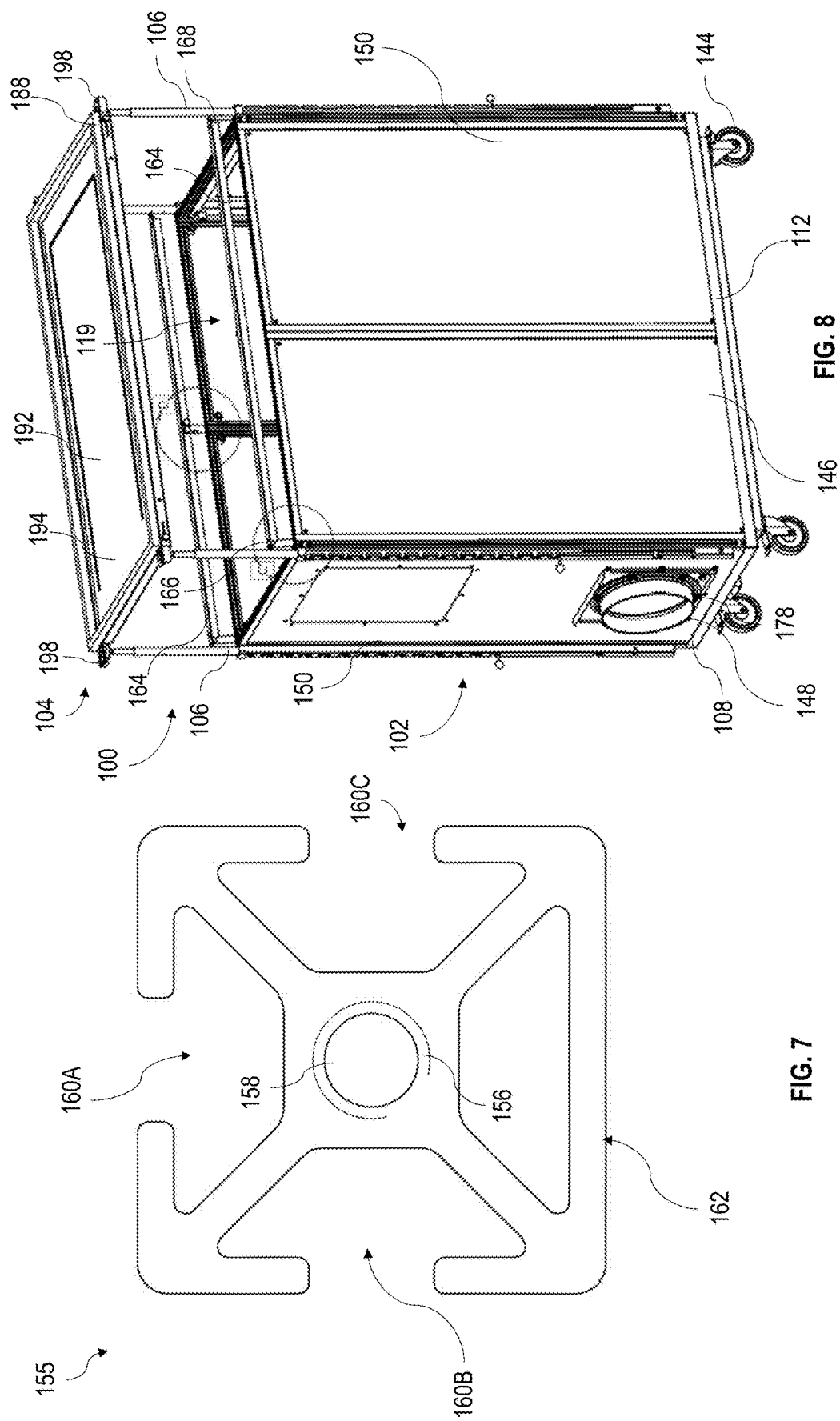

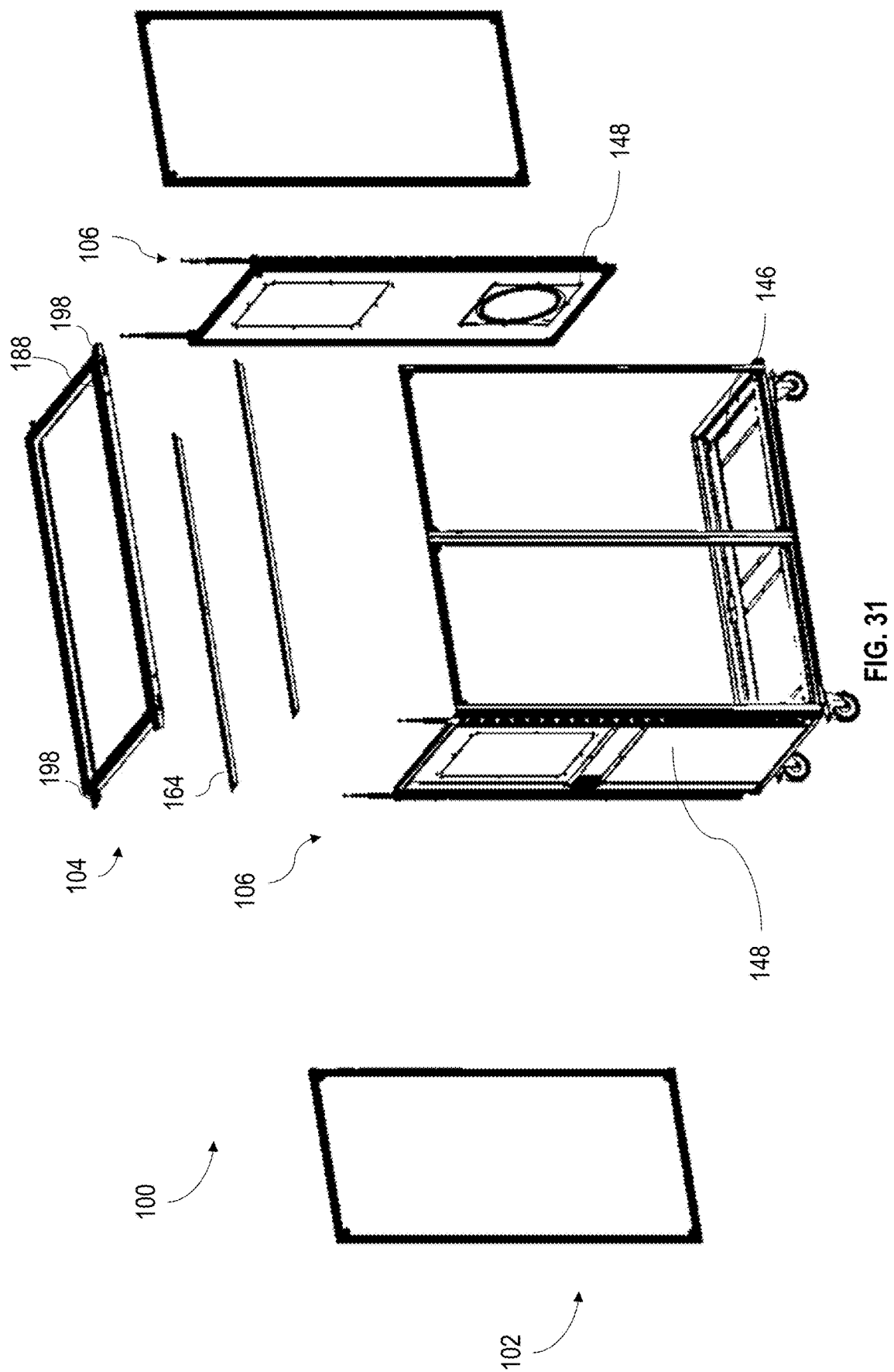

COLLAPSIBLE MAINTENANCE CART

REFERENCE TO RELATED APPLICATION

This application claims the benefit of U.S. Provisional Patent Application No. 63/257,750, filed on Oct. 20, 2021, and entitled COLLAPSIBLE MAINTENANCE CART, the content of which is hereby incorporated by reference in its entirety.

FIELD OF THE INVENTION

This application relates to systems and methods for facilitating wall and ceiling access while providing air filtration to contain and capture hazardous and/or non-hazardous particulate, biological, and/or gas phase contaminants released into the air because of these activities.

BACKGROUND

Many buildings, including but not limited to, healthcare facilities such as hospitals, may require construction and maintenance including tasks necessitating access to areas that cannot be regularly cleaned, such as within walls or above a ceiling. It may be desirable to avoid disruption to other activities within the building, and, unlike many facilities, healthcare and other facilities include requirements related to cleanliness and minimizing the risk of hospital acquired infections caused by hazardous airborne contaminants. There is a need to protect patients and employees from exposure to construction particles that can potentially transmit airborne infectious diseases and/or other contaminants or debris. While some construction/maintenance carts have been developed, existing carts are bulky and take up space, which may make them difficult to gain access to certain areas and store when not in use.

SUMMARY

The terms "invention," "the invention," "this invention" and "the present invention" used in this patent are intended to refer broadly to all the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a collapsible maintenance cart includes a lower structure and an upper structure. The collapsible maintenance cart is movable between a stowed configuration and a working configuration. In certain embodiments, in the working configuration, the lower structure and the upper structure together define an interior workspace and the upper structure is movable relative to the lower structure such that the collapsible maintenance cart comprises a raised position and a lowered position. In various embodiments, in the stowed configuration, a height of the collapsible maintenance cart in the stowed configuration is less than ½ a height of the collapsible maintenance cart in the lowered position of the working configuration.

According to some embodiments, a maintenance cart includes a base defining a receiving area and includes a channel within the receiving area. The maintenance cart also includes a plurality of side panels, each side panel of the plurality of side panels including a panel body and a bottom frame supporting the panel body. In various embodiments, the bottom frame of at least one side panel of the plurality of panels is removably positioned within the channel.

According to various embodiments, a maintenance cart includes a base defining a receiving area and including a fastening mechanism at least partially within the receiving area. The maintenance cart also includes a plurality of side panels, each side panel of the plurality of side panels including a panel body and a bottom frame supporting the panel body. In some embodiments, the fastening mechanism selectively engages the bottom frame of at least one side panel of the plurality of side panels within the receiving area and selectively connects the at least one side panel of the plurality of side panels to the base.

According to some embodiments, a maintenance cart includes a base defining a receiving area and including a fastening mechanism within the receiving area. In some cases, the fastening mechanism is movable relative to the base within the receiving area. The maintenance cart also includes a plurality of side panels, each side panel of the plurality of side panels including a panel body and a bottom frame supporting the panel body. In certain embodiments, at least one side panel is positioned in the receiving area such that the fastening mechanism is movable relative to the bottom frame of the at least one panel of the plurality of panels and selectively attachable to and detachable from the bottom frame of the at least one panel of the plurality of panels.

According to certain embodiments, a collapsible maintenance cart includes an upper structure and a lower structure. The lower structure includes a base with a first end, a second end opposite the first end, and a side extending between the first end and the second end. The lower structure also includes a first end panel at the first end and extending upwards from the base, a second end panel at the second end and extending upwards from the base, a side panel assembly along the side of the base and extending upwards from the base, and a top support bar opposite from the base and comprising a first end and a second end. In some embodiments, the first end of the top support bar includes a first set of studs insertable into the first end panel and the side panel assembly, and the second end of the top support bar includes a second set of studs insertable into the second end panel and the side panel assembly. In various embodiments, the base, the first end panel, the second end panel, and the side panel assembly define a workspace of the maintenance cart, and the upper structure is supported above the lower structure and is movable between a lowered position and a raised position relative to the lower structure.

According to some embodiments, a collapsible maintenance cart includes an upper structure with a frame defining a central aperture comprising a central axis and a plurality of retractable brackets. Each retractable bracket of the plurality of retractable brackets may be selectively movable within the frame, and each retractable bracket may be movable in a direction perpendicular to the central axis. The maintenance cart also includes a lower structure with a base and a plurality of side panels. In some cases, the upper structure is supported above the lower structure and is movable relative to the lower structure between a raised position and a lowered position, and the lower structure and upper structure together define a workspace of the maintenance cart.

According to various embodiments, a collapsible maintenance cart includes air upper structure, a lower structure including a base and a plurality of side panels, and at least one structural member connecting the upper structure to the lower structure. In some respects, the at least one structural member supports the upper structure above the lower structure and such that the upper structure is movable relative to the lower structure between a raised position and a lowered position. In various cases, the lower structure and the upper structure together define a workspace of the maintenance cart. In certain cases, the at least one structural member includes an adjustment post with a plurality of notches and a sliding groove connecting the plurality of notches. Tt least one notch of the plurality of notches optionally faces a first direction and at least one notch of the plurality of notches optionally faces a second direction different from the first direction. The at least one structural member may also include a sliding post movable within the adjustment post that includes an adjustment knob extending through the adjustment post and slidable within the sliding groove of the adjustment post. In some examples, the adjustment knob is positionable within at least one notch of the plurality of notches based on a position of the upper structure relative to the lower structure.

According to certain embodiments, a collapsible maintenance cart includes a rigid-sided lower structure and an upper structure, and the collapsible maintenance cart is movable between a stowed configuration and a working configuration. In certain aspects, in the working configuration, the lower structure and the upper structure together define an interior workspace and the upper structure is movable relative to the lower structure such that the collapsible maintenance cart comprises a raised position and a lowered position, and, in the stowed configuration, a height of the collapsible maintenance cart in the stowed configuration is less than ½ a height of the collapsible maintenance cart in the lowered position of the working configuration.

According to various embodiments, a collapsible maintenance cart includes an upper structure and a lower structure with a plurality of panels. The collapsible maintenance cart is movable between a stowed configuration and a working configuration. In certain embodiments, in the working configuration, the plurality of panels extends in a first direction relative to the upper structure, and, in the stowed configuration, the plurality of panels extends in a second direction perpendicular to the first direction.

Various implementations described in the present disclosure can include additional systems, methods, features, and advantages, which can not necessarily be expressly disclosed herein but will the apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 3 is an end view of the maintenance cart of FIG. 1.

FIG. 4 is a side view of the maintenance cart of FIG. 1.

FIG. 5 is another end view of the maintenance cart of FIG. 1.

FIG. 6 is a top view of the maintenance cart of FIG. 1.

FIG. 7 is an end view of a strut of the maintenance cart of FIG. 1.

FIG. 8 is a perspective view of the maintenance cart of FIG. 1.

FIG. 31 illustrates another step for changing the maintenance cart of FIG. 1 from the stowed configuration to the working configuration.

DETAILED DESCRIPTION

Figure 2:
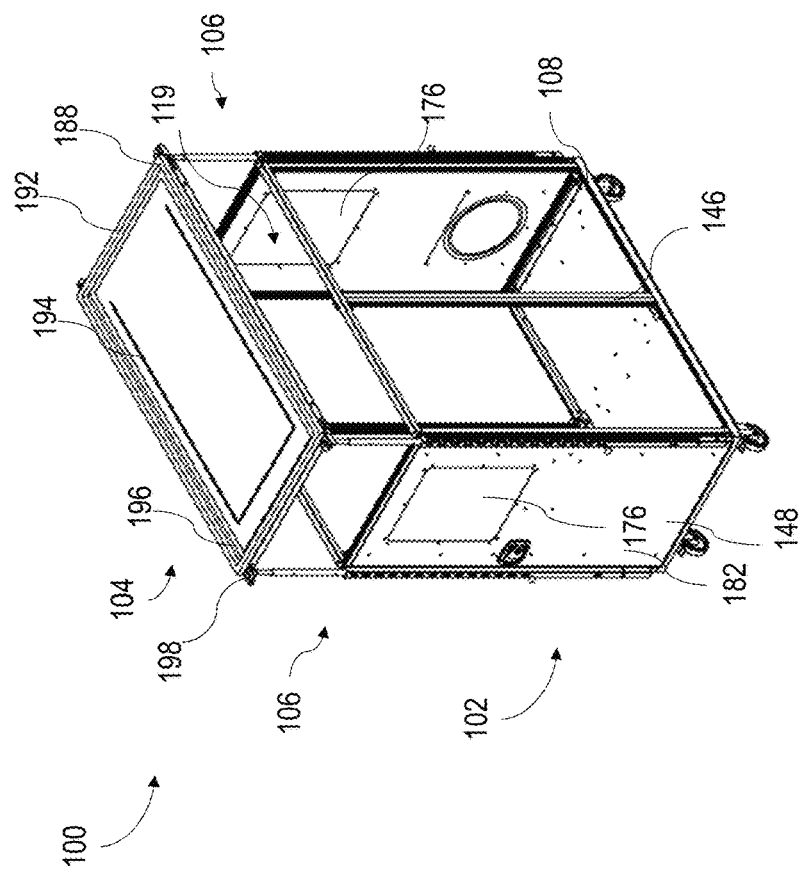
FIG. 2 illustrates the maintenance cart of FIG. 1 with the upper structure in a lowered position.
Figure 1:
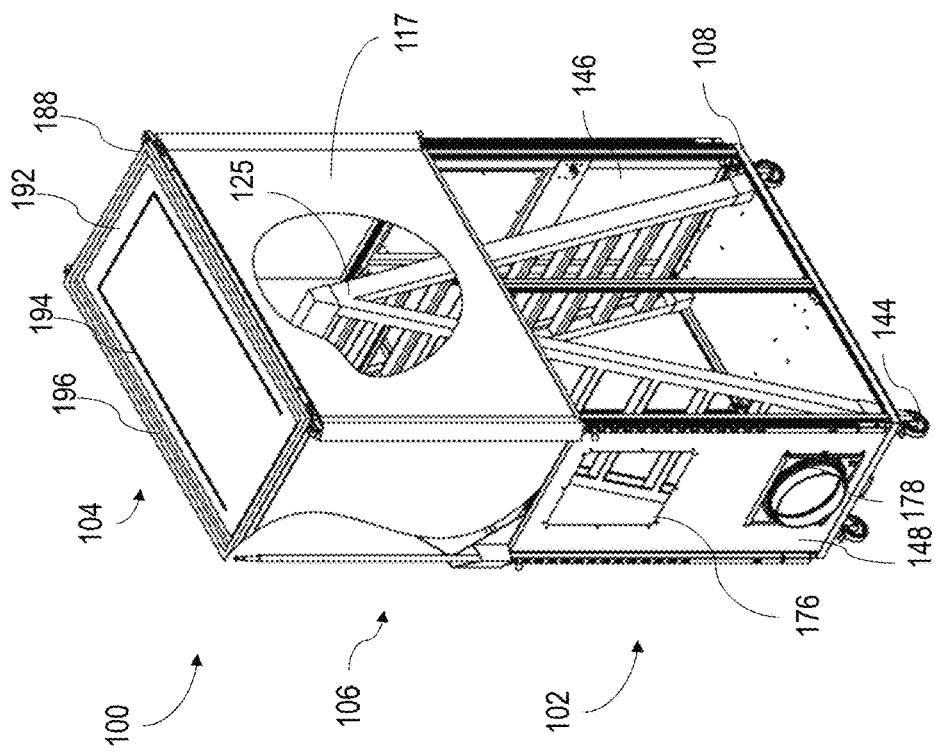
FIG. 1 illustrates a maintenance cart according to embodiments with an upper structure in a raised position relative to a lower structure.

Disclosed herein are construction/maintenance carts that facilitate wall and ceiling access while isolating an interior workspace of the maintenance cart from a surrounding environment. In certain embodiments, the maintenance carts described herein are configurable between a stowed configuration and a working configuration. In the working configuration, the maintenance cart may define the interior workspace that a user may utilize to facilitate wall and/or ceiling access, and in the stowed configuration, the maintenance cart may not define the interior workspace. The maintenance cart movable to the stowed configuration may facilitate storage of the maintenance cart when not in use and transport of the maintenance cart to a particular working location by providing a compact structure that is easy to position, place, and move by a user compared to traditional carts. In certain embodiments, the maintenance carts disclosed herein are modular compared to traditional carts such that the necessary modules (i.e., side assembly, end assembly, base, upper structure, lower structure, etc.) can be attached to one another to create a maintenance cart with desired features or a desired workspace. In various embodiments, the maintenance carts provided herein may have improved portability, transport, and storage compared to traditional carts. Various other advantages and benefits may be realized with the systems and methods described herein, and the aforementioned benefits should not be considered limiting.

FIGS. 1-41 illustrate an example of a maintenance cart 100 according to various embodiments. As described in detail below, the maintenance cart 100 is adjustable between a stowed configuration (see, e.g., FIGS. 20-25) and a working configuration (see, e.g., FIGS. 1-6). In certain embodiments, in addition to having the stowed configuration and the working configuration, in the working configuration, a height of the maintenance cart 100 can be adjusted to allow access to and physical contact with ceilings of different heights while sealing an interior workspace of the maintenance cart 100 from a surrounding environment.

The maintenance cart 100 generally includes a lower structure 102 and an upper structure 104. One or more adjustment assemblies 106 may support the upper structure 104 relative to the lower structure 102 in the working configuration and may allow for a position of the upper structure 104 relative to the lower structure 102 to be adjusted as desired.

The lower structure 102 of the maintenance cart 100 includes a base 108, one or more side assemblies 146, and one or more end assemblies 148. As best illustrated in FIGS. 11-13, 19, and 20, the base 108 includes an upper surface 110 and a perimeter wall 112 surrounding the upper surface 110 and extending upwards from the upper surface 110. The upper surface 110 and the perimeter wall 112 together define a receiving area 114 of the base 108 that may receive additional components of the lower structure 102 as discussed in detail below. In certain embodiments, the base 108 includes opposing ends 116A-B and opposing sides 118A-B, where a length of the sides 118A-B is greater than a length of the ends 116A-B, although in other embodiments the base 108 may have other shapes and dimensions as desired. One or more motive devices 144 may be supported on the base 108 enabling movement of the base 108 and thus the maintenance cart 100 as desired. In the embodiment illustrated, the motive devices 144 are wheels, although any other type of motive device or combination of motive devices may be used as desired.

Figure 11:
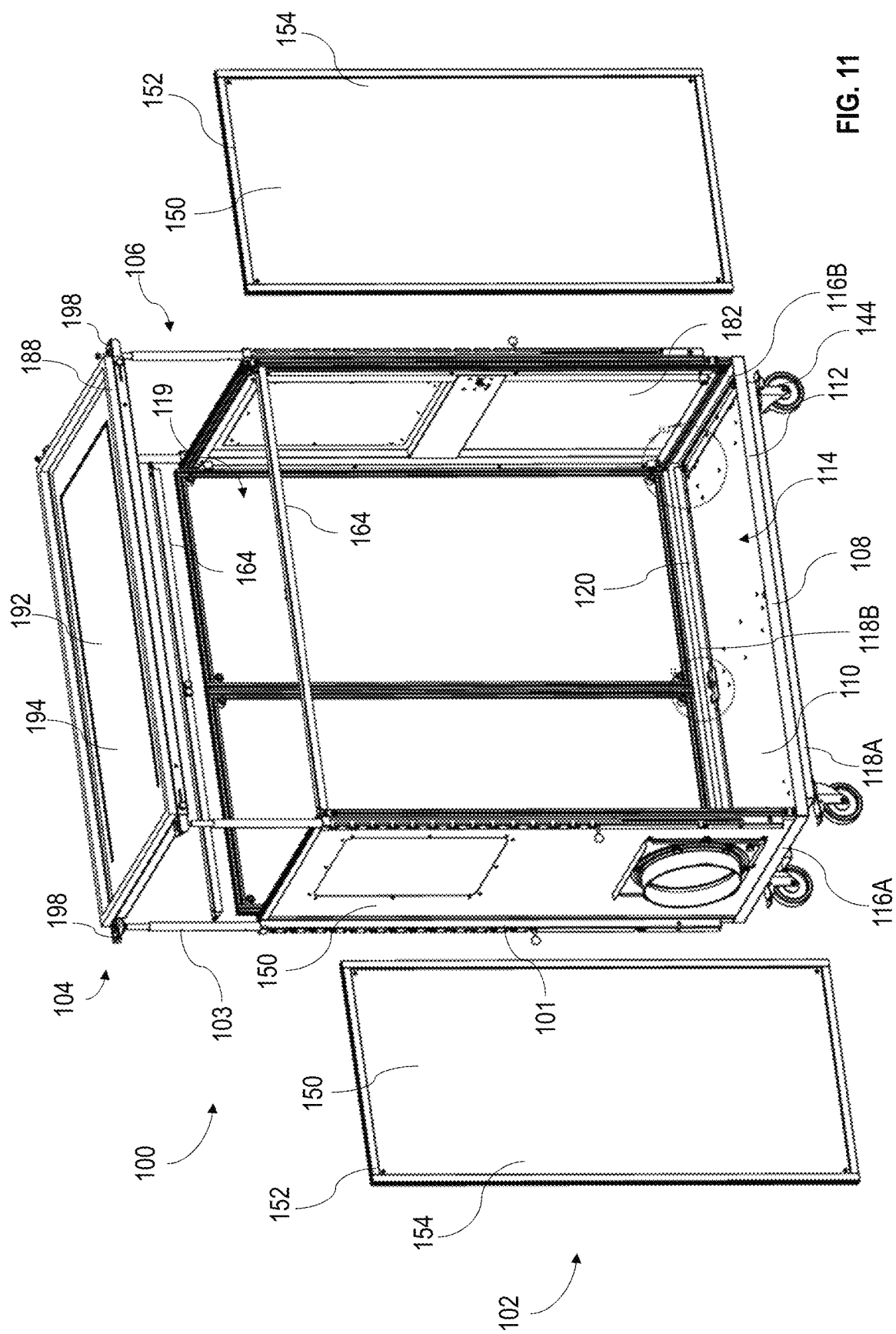
FIG. 11 is a perspective view of the maintenance cart of FIG. 1 with a side assembly disassembled.
Figure 12:
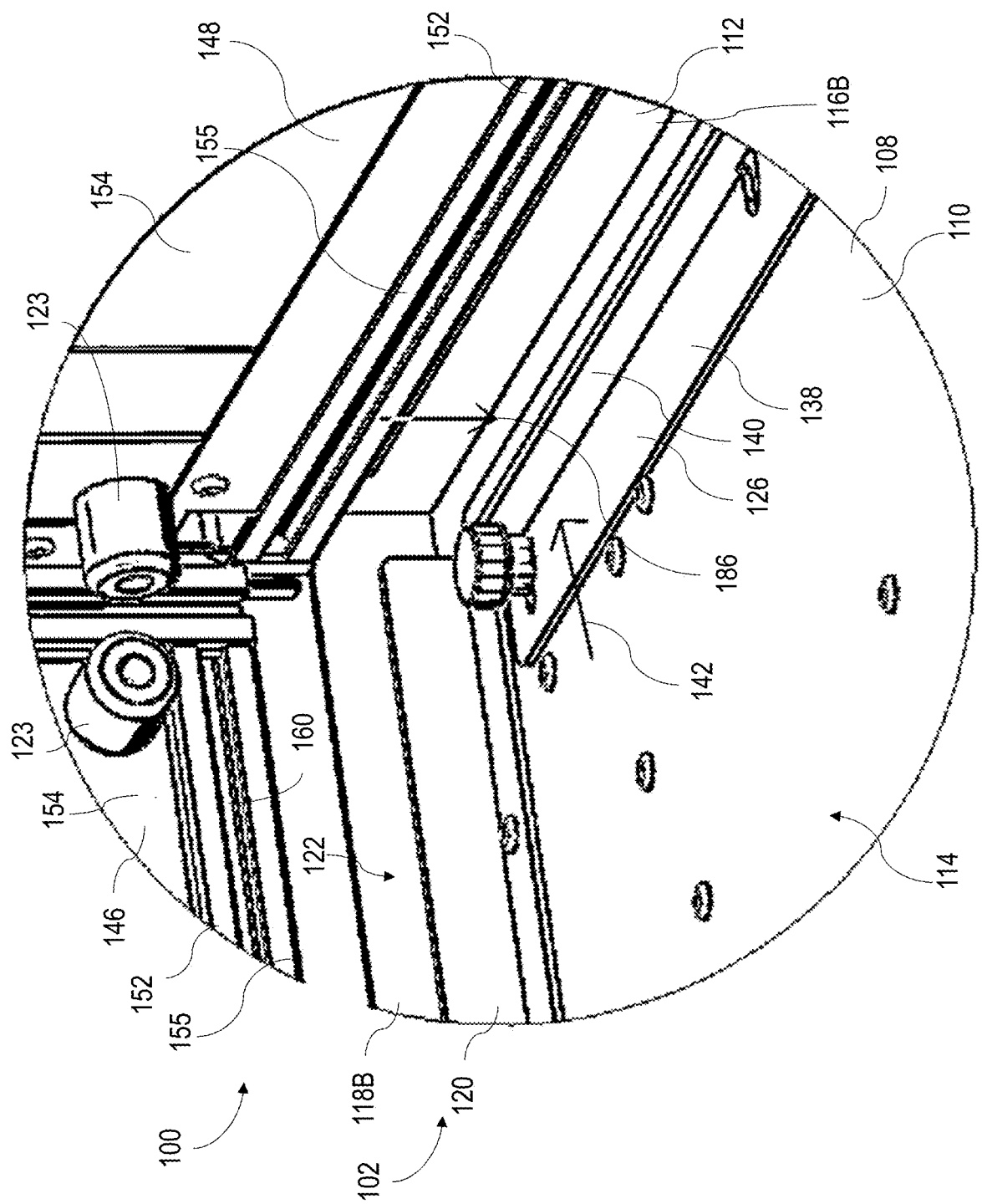
FIG. 12 is a perspective view of the maintenance cart of FIG. 1 taken from detail circle E in FIG. 11.
Figure 13:
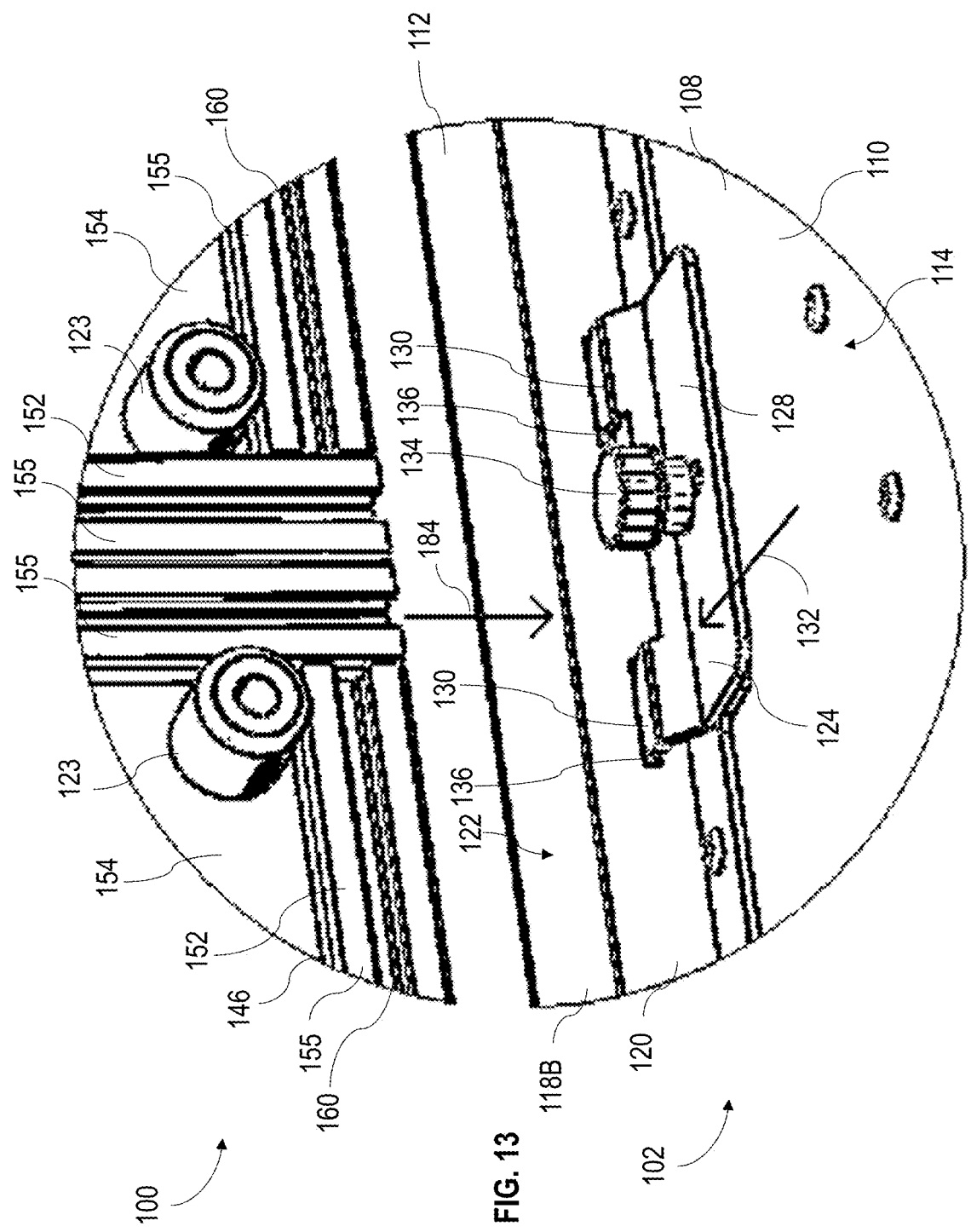
FIG. 13 is a perspective view of the maintenance cart of FIG. 1 taken from detail circle F in FIG. 11.
Figure 15:
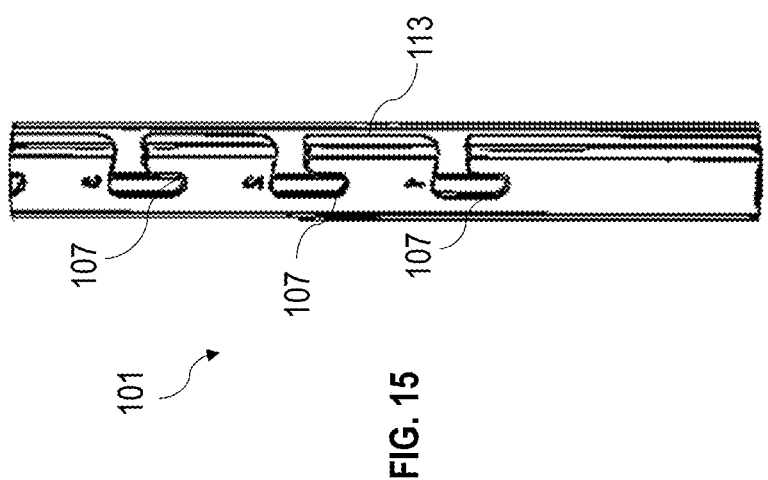
FIG. 15 illustrates a portion of the end of FIG. 14 taken from detail circle A in FIG. 14.

In certain embodiments, and as best illustrated in FIGS. 11-13, the base 108 includes one or more channel walls 120 on the upper surface 110 and within the receiving area 114 of the base 108. The channel walls 120 are spaced apart from the perimeter wall 112 of the base 108, and the channel walls 120 and the perimeter wall 112 together define one or more channels 122 within the receiving area 114. In the embodiment illustrated, the base 108 includes two channel walls 120, each provided adjacent to a side 118A-B of the base 108 such that channels 122 are defined along the sides 118A-B of the base 108. As discussed in detail below, a side assembly 146 and/or an end assembly 148 may be at least partially received within one of the channels 122 when the maintenance cart 100 is in the working configuration. In the embodiment illustrated, the side assemblies 146 are positioned within the channels 122. In certain embodiments, the channel walls 120 are fixed relative to the base 108 using various suitable mechanical or chemical fasteners as desired, although in other embodiments they need not be fixed.

In some embodiments, the base 108 may also include one or more fastening mechanisms for selectively engaging the side assembly 146 and/or the end assembly 148 positioned on the base 108 within the receiving area 114 to connect the assemblies 146, 148 with the base 108. The fastening mechanisms may be various suitable devices or components for selectively engaging and/or disengaging the assemblies 146, 148. Some non-limiting examples of fastening mechanisms include, but are not limited to, brackets, clips, clasps, pins, bolts, snap-fit connectors, clamps, hocks, other mechanical fasteners, and/or other suitable fastening mechanisms as desired. Optionally, the fastening mechanisms are at least partially positioned within the receiving area 114 and/or optionally engage the assemblies 146, 148 within the receiving area 114.

In the embodiment illustrated, the fastening mechanisms are brackets that are movable relative to the base 108. In the embodiment illustrated, the brackets are slidable, although in other embodiments they need not be slidable and/or need not be movable relative to the base 108. In the embodiment illustrated, the brackets are supported within the receiving area 114. As best illustrated in FIGS. 11-13, in the embodiment illustrated, the base 108 includes side-sliding brackets 124 and end-sliding brackets 126.

Referring to FIG. 13, each side-sliding bracket 124 includes a bracket base 128 and one or more inserts 130 extending outwards from the bracket base 128 that may engage a side of the side assembly 146. In certain embodiments, and as illustrated in FIG. 13, the one or more inserts 130 are optionally vertically offset from the bracket base 128. The bracket base 128 is slidable along the base 108 (represented by arrow 132 in FIG. 13), and an adjuster 134 may selectively engage the bracket base 128 to limit or prevent movement of the side-sliding bracket 124 when the side-sliding bracket 124 is in a desired position. In the embodiment illustrated, the adjuster 134 is an adjustment knob that can be selectively tightened to limit movement of the side-sliding bracket 124 or loosened to enable movement of the side-sliding bracket 124.

In certain embodiments, and as illustrated in FIG. 13, the side-sliding bracket 124 may engage the side assembly 146 positioned within the channel 122 in the receiving area 114 and/or the side assembly 146 positioned adjacent to the sides 118A-B of the base 108. In some cases, the side-sliding bracket 124 may engage both the channel wall 120 and the side assembly 146 and/or the end assembly 148 positioned within the channel 122, which may provide an improved connection between the base 108 and the side assembly 146 (and/or the end assembly 148) positioned within the channel 122. As illustrated in FIG. 13, in these embodiments, the channel wall 120 may include one or more apertures 136 for receiving the inserts 130 of the side-sliding bracket 124.

Referring to FIG. 12, similar to the side-sliding bracket 124, each end-sliding bracket 126 includes a bracket base 138 and one or more inserts 140 extending from the bracket base 138. As illustrated in FIG. 12, while the inserts 130 of the side-sliding bracket 124 extend outwards, the inserts 140 of the end-sliding bracket 124 extend upwards relative to the bracket base 138 and may engage a bottom of the end assembly 148. The bracket base 138 is slidable along the base 108 (represented by arrow 142 in FIG. 12), and another adjuster 134 may selectively engage the bracket base 128 to limit or prevent movement of the end-sliding bracket 126 when the end-sliding bracket 126 is in a desired position.

Referring to FIGS. 1-18, in various embodiments, the side assemblies 146 and end assemblies 148 include panels 150, each of which includes a frame assembly 152 and a panel body 154. The panel body 154 may be constructed from materials that are rigid or semi-rigid including but not limited to metal, polycarbonate, plastic, or composite materials. As used herein, rigid or semi-rigid materials generally hold their shape, are self-supporting, and/or may offer structure and support. The panel body 154 may be transparent, translucent, opaque, have other optical finishes as desired, or a combination thereof. The panel body 154 may also include feature(s) related to thermal and/or acoustical insulation. In some examples, the features include gypsum wall board, at least one metallic layer on the interior and/or exterior side of the module, and/or any other necessary thermal insulation and/or acoustical insulation. For example, outer metallic layers may sandwich insulation (along with the structural components of the module) between the metallic layers.

In some embodiments, and as illustrated in FIGS. 1-6 for example, the panel bodies 154 need not be the same type of panel body. For example, in the embodiment illustrated, the panel bodies 154 of the side assemblies 146 are all transparent, monolithic structures, while the panel bodies 154 of the end assemblies 148 are opaque and include windows 176. In addition, one of the end assemblies 148 optionally includes an exhaust panel assembly 178, and the panel body 154 of the other end assembly 148 optionally is a door 182 having a hinge (not visible) and handle 180 such that the panel body 154 is movable relative to the frame assembly 152 to function as a door providing selective access to the workspace of the maintenance cart 100. Various other combinations of panel body 154 types may be used to form the maintenance cart as desired. As one non-limiting example, the panel bodies 154 of both end assemblies 148 may be doors 182. As another non-limiting example, the end assemblies 148 may include monolithic panel bodies 154 that are not movable relative to the respective frame assemblies 152, and one of the side assemblies 146 includes the door 182 as one or both panel bodies 154.

The frame assembly 152 may include one or more sections of a strut 155, which may be metallic, thermoplastic, composite, or any other appropriate material or combination of materials as desired. Referring to FIG. 7, the strut 155 may include a central hub 156 with an aperture 158. The aperture 158 may be present at one or both ends of the strut 155 and, in some cases, may be threaded. In other embodiments, the aperture 158 may be omitted. The outer surface of the strut 155 includes at least one channel 160, and in certain embodiments, the outer surface of the strut 155 includes a plurality of channels 160. The strut 155 may likewise have various cross-sectional shapes as desired. In the embodiment illustrated in FIG. 7, the outer surface of the strut 112 has a generally square cross-section and may include one side with a continuous surface 162. The strut 155 in FIG. 2 also has three sides with channels including a first channel 160A opposite the continuous surface 162 and second and third channels 160B-C on faces adjacent the continuous surface 162. In some examples, each panel 150 is constructed using struts 155 such that each such member includes the central hub 156, one or more apertures 158, and multiple channels 160 extending along its perimeter. In addition, although not illustrated, each member optionally may include a compressible member inserted into at least one of the channels along the length of the member. For example, a strip of foam may be inserted into at least one of the channels. In some cases, the compressible member may be large enough to occupy most of the channel and protrude through the opening of the channel. In some examples, a portion of another component, such as a panel assembly and/or door assembly, may be inserted into a channel with a compressible member such that the compressible member compresses and/or deforms around the component within the channel. The compressible member thus creates a tight secure fit of the component within the channel and reduces movement, rattling, vibration, abrasion, etc. of the component around its perimeter.

As illustrated in FIGS. 12 and 13, for example, the side assemblies 146 and the end assemblies 148 may be assembled with the base 108 by positioning at least a portion of the frame assemblies 152 within the receiving area 114 of the base 108. In particular, and as illustrated in FIG. 13, the side assemblies 146 may be assembled with the base 108 by positioning lower struts 155 of the frame assemblies 152 within the channels 122 (represented by arrow 184 in FIG. 13). Optionally, the side assemblies 146 are positioned within the channels 122 such that at least one of the channels 160 of the strut 155 is facing the channel wall 120, and once a side assembly 146 is positioned within the corresponding channel 122, the side-sliding bracket 124 is slid relative to the base such that the inserts 130 engage both the channel wall 120 and the channels 160 facing the channel wall 120. As illustrated in FIG. 12, the end panel assemblies may be assembled with the base 108 by positioning lower struts 155 of the frame assemblies 152 such that the inserts 140 of the end-sliding brackets 126 are positioned within downward facing channels 160 of the lower struts 155 (represented by arrow 186 in FIG. 12). In such embodiments, the end-sliding brackets 126 may be slid relative to the base 108 before or after the struts 155 are positioned on the inserts 140.

Figure 9:
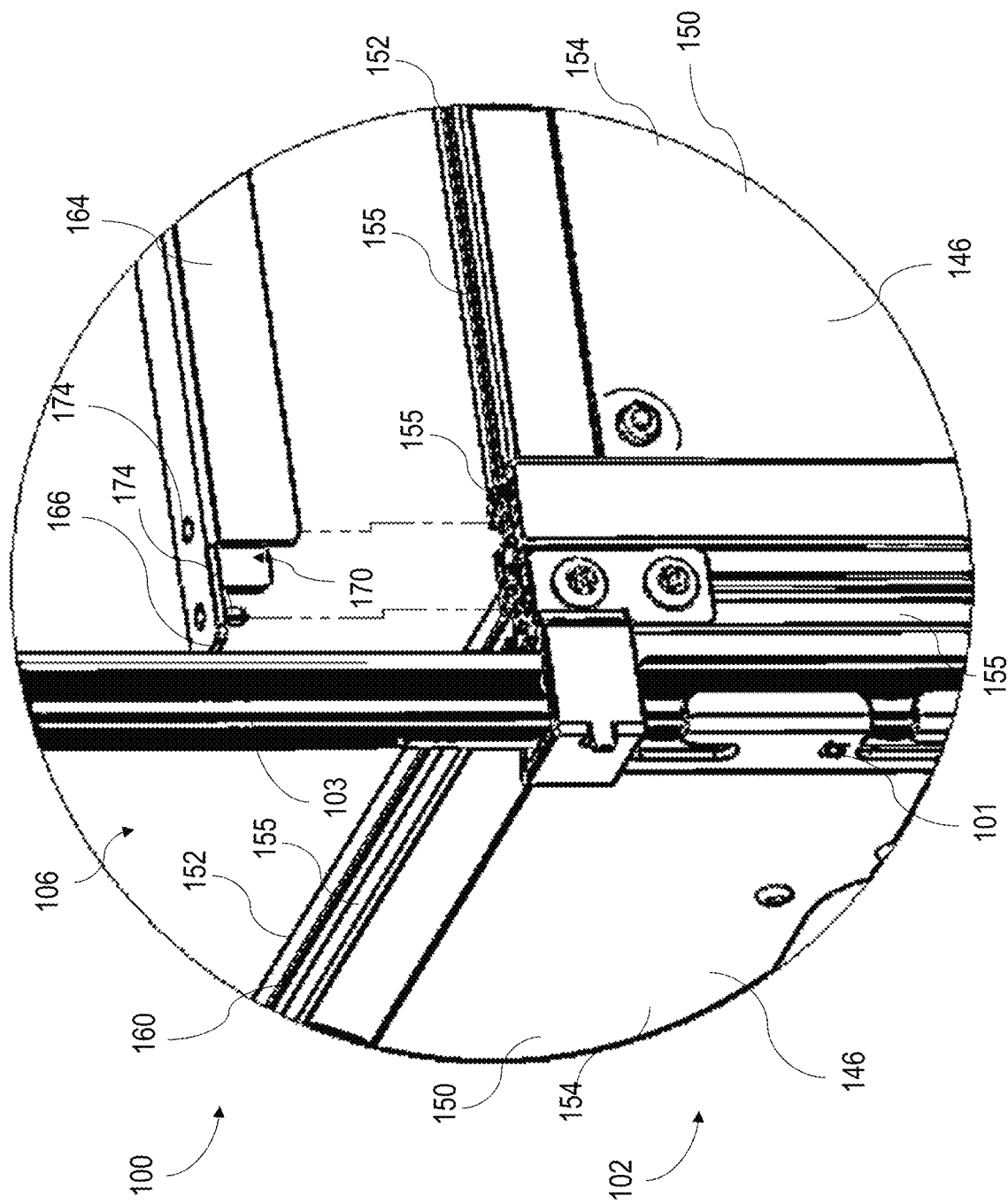
FIG. 9 is a perspective view of the maintenance cart of FIG. 1 taken from detail circle C in FIG 8.
Figure 10:
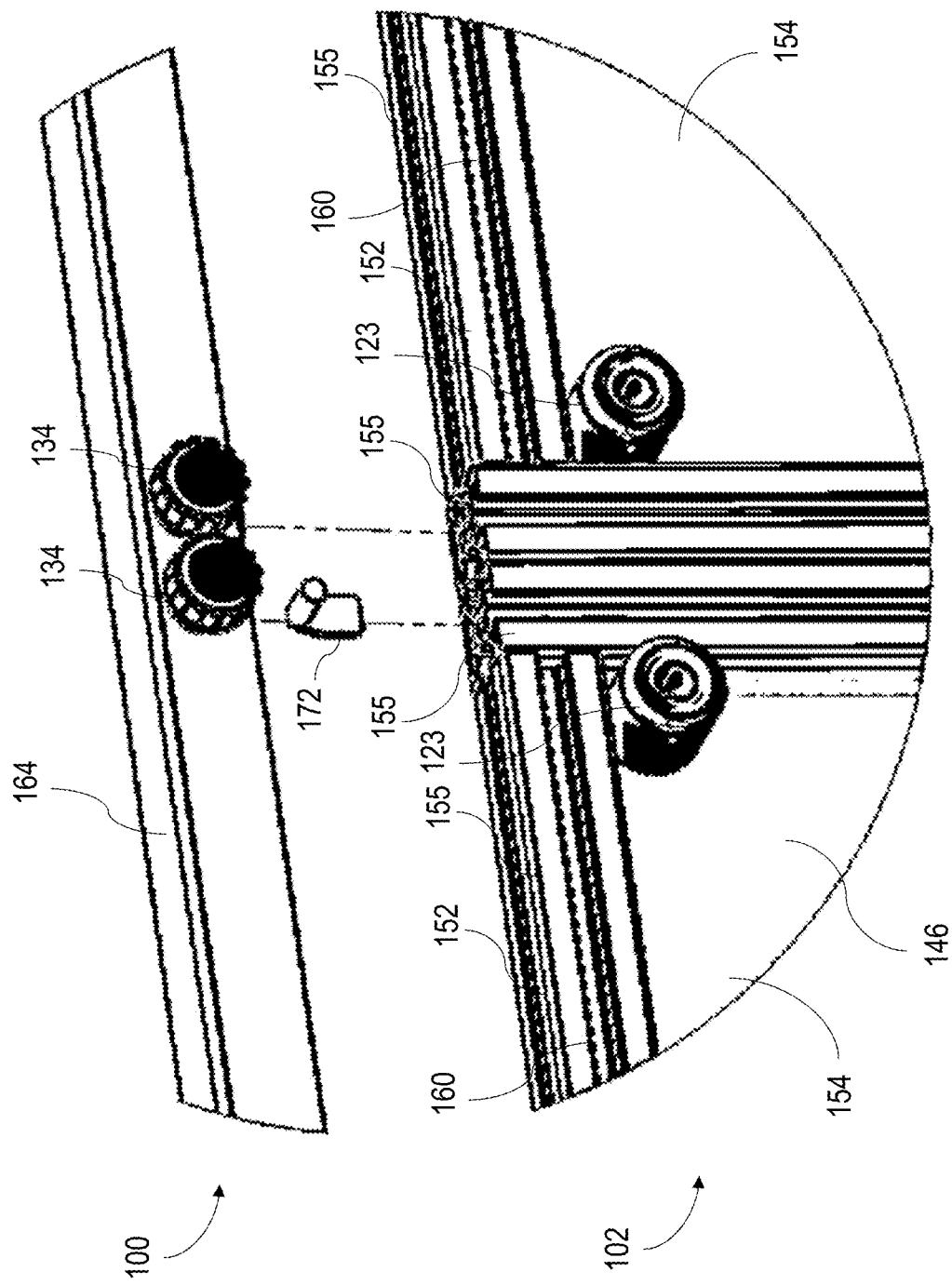
FIG. 10 is a perspective view of the maintenance cart of FIG. 1 taken form detail circle D in FIG. 8.

Referring to FIGS. 8-10, in various embodiments, adjacent panels 150 of the side assembly 146 may be joined together at a top end using a top support bar 164. The top support bar 164 includes a first end 166 and a second end 168. As best illustrated in FIG. 9, the top support bar 164 includes a receiving area 170 that may receive the top of the frame assemblies 152 of the panels 150. In certain aspects, the frame assemblies 152 are positioned within the receiving area 170 such that the top support bar 164 overlaps one or more of the channels 160 of the struts 155 forming the top of the panels 150. In such embodiments, the overlap and/or receiving of the tops of the panels 150 within the receiving area 170 may position the panels 150 relative to each other to form the side assembly 146. In some embodiments, and as illustrated in FIG. 10, the top support bar 164 includes one or more inserts 172 that are positionable in channels 160 of the panels 150. Another adjuster 134 may be used to control the insert 172 such that the insert 172 is engaged with or disengaged from the panels 150.

In addition to joining adjacent panels 150 of the side assembly 146, the top support bar 164 may also join an adjacent side assembly 146 and end assembly 148. As best illustrated in FIG. 9, in such embodiments, one or both ends (i.e., the first end 166 and/or the second end 168) of the top support bar 164 include a set of inserts or studs 174 that are selectively positioned in an aperture 158 of the end assembly 148 and an aperture 158 of the side assembly 146. In FIG. 9, the stud 174 that engages the aperture 158 of the side assembly 146 is within the receiving area 170 and thus not visible in this view; however, in other embodiments the studs 174 need not be within the receiving area 170.

Figure 20:
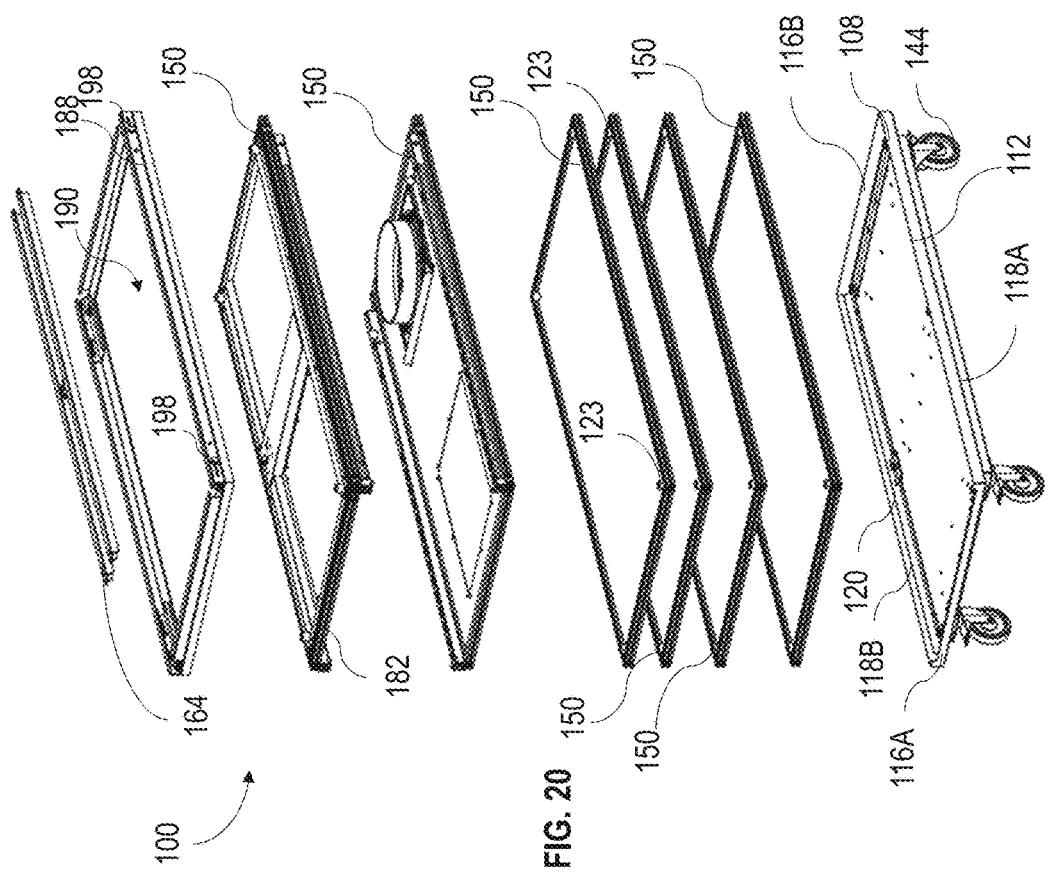
FIG. 20 is an exploded view of the maintenance cart of FIG. 1 being positioned in a stowed configuration.
Figure 23:
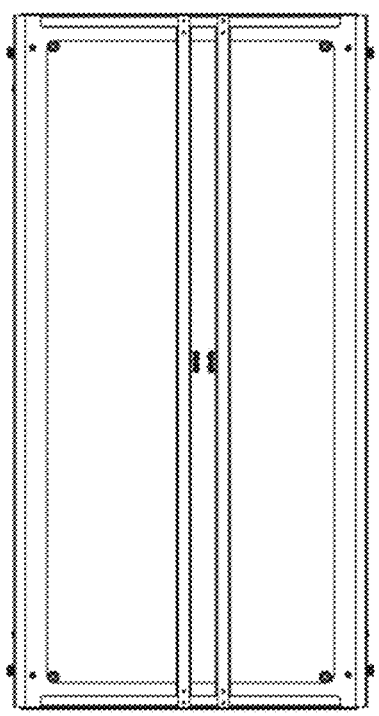
FIG. 23 is a top view of the maintenance cart of FIG. 1 in the stowed configuration.
Figure 25:
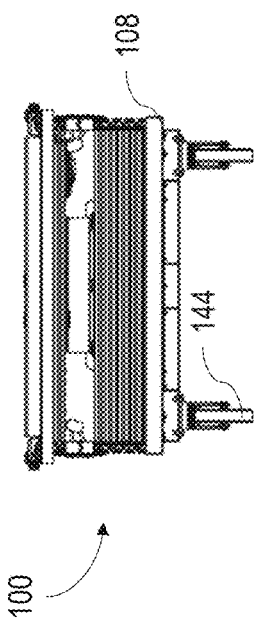
FIG. 25 is an end view of the maintenance cart of FIG. 1 in the stowed configuration.
Figure 22:
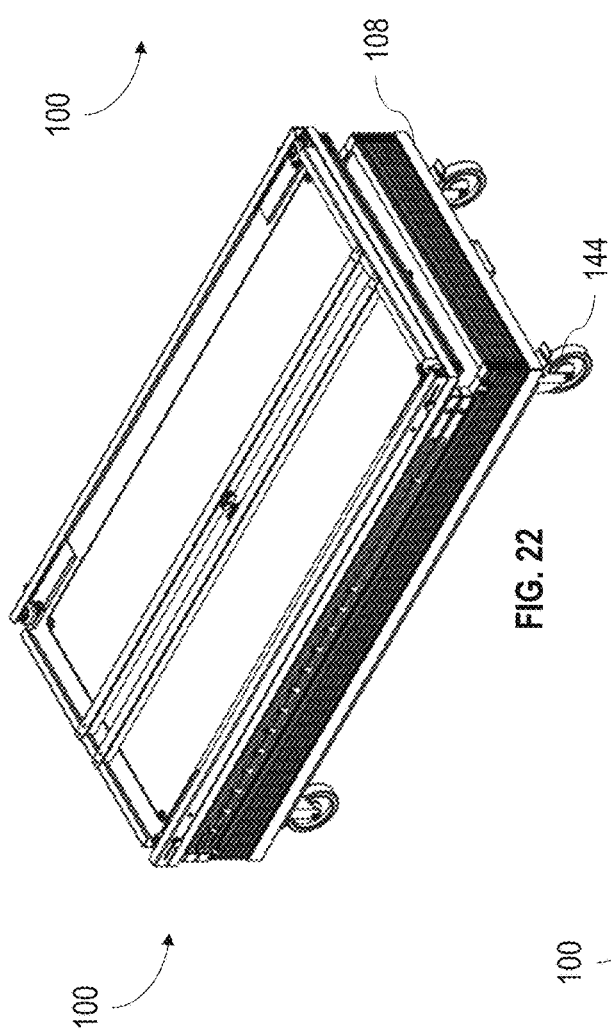
FIG. 22 is a perspective view of the maintenance cart of FIG. 1 in the stowed configuration.
Figure 24:
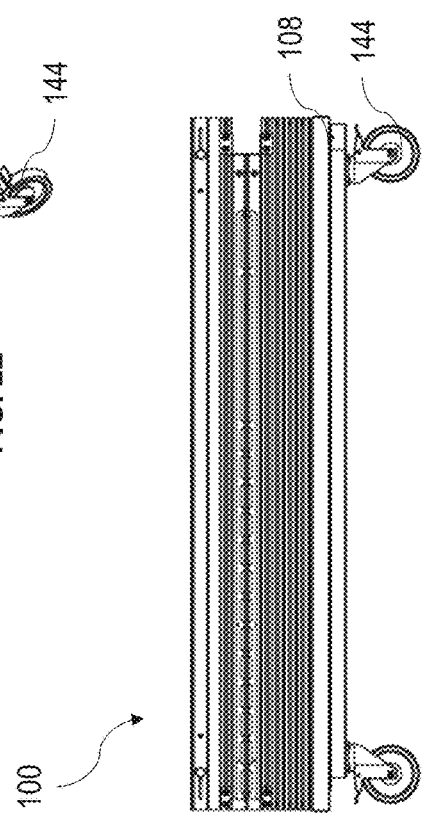
FIG. 24 is a side view of the maintenance cart of FIG. 1 in the stowed configuration.

Referring to FIGS. 1-6, 8, 11, and 20, for example, the upper structure 104 includes a support 188 defining a central opening 190. In various embodiments, the upper structure 104 includes one or more brackets 198 that are movable between a stowed position and a deployed position. In certain embodiments, the brackets 198 are movable in a direction substantially perpendicular to an axis of the central opening 190, although they need not be. In various embodiments, in the stowed position, the brackets 198 are within the support 188, and in the deployed position, the brackets 198 extend outwards from the support 188. FIG. 20 illustrates the brackets 198 in the stowed position, and FIG. 11, for example, illustrates the brackets 198 in the deployed position. In various embodiments, the brackets 198 may engage the adjustment assemblies 106 in the deployed position.

Optionally, the upper structure 104 includes a cover 192 having an access door 194 that is supported on the support 188, and the access door 194 may selectively provide or restrict access through the central opening 190. In the embodiment illustrated, the cover 192 is a flame-resistant fabric, although various other materials may be used as desired. Optionally, a gasket 196 for providing a seal with a ceiling may be supported by the support 188. In the embodiment illustrated, the gasket 196 is a foam gasket, although other types of gaskets and/or sealing members may be used as desired.

As mentioned, in the working configuration, the one or more adjustment assemblies 106 may support the upper structure 104 above the lower structure 102. The adjustment assemblies 106 may allow for a height of the maintenance cart 100 to be adjusted as desired and allow for movement of the upper structure 104 relative to the lower structure 102. In some embodiments, the adjustment assemblies 106 may allow for the maintenance cart 100 to be adjustable between a minimum height (FIG. 2) and a maximum height (FIG. 1) when in the working configuration. In one non-limiting example, the height of the maintenance cart 100 at the minimum height may be around 72 inches, and the height of the maintenance cart 100 at the maximum height may be around 122 inches, although in other embodiments the maintenance cart 100 may have other minimum and/or maximum heights as desired. As some non-limiting examples, the minimum height optionally may be from about 60 inches to about 84 inches, and the maximum height may be from greater than 84 inches to 144 inches. However, in other embodiments, the minimum height and/or the maximum height may be other ranges as desired, including heights less than 60 inches, greater than 84 inches, less than 84 inches, and/or greater than 144 inches.

The adjustment assemblies 106 may be various suitable devices or mechanisms for supporting the upper structure 104 and allowing movement of the upper structure 104 relative to the lower structure 102. As best illustrated in FIGS. 15-19, in the embodiment illustrated, each adjustment assembly 106 includes an adjustment post 101 connected to the lower structure 102 and a sliding post 103 corrected to the upper structure 104 and having a telescoping engagement with the adjustment post 101. Other devices or structures may be used as the adjustment assemblies 106 as desired, and each adjustment assembly need not be the same.

In various embodiments, the adjustment post 101 is a hollow structure that at least partially receives the sliding post 103 within it. The adjustment post 101 may be connected to one of the frame assemblies 152 of an end assembly 148 or a side assembly 146 using one or more brackets 105. As such, while the adjustment posts 101 in FIGS. 14-18 are illustrated as being connected to the end assembly 148, in other embodiments they may be connected to the side assemblies 144.

Figure 17:
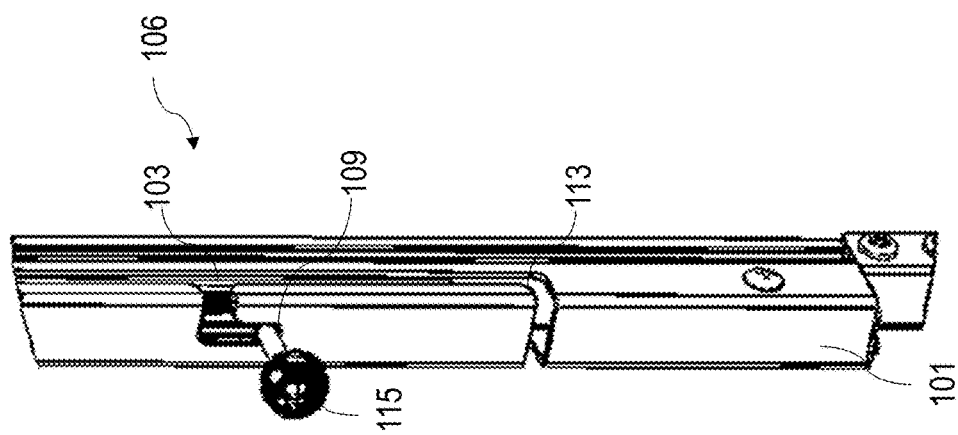
FIG. 17 illustrates a portion of the end of FIG. 14 taken from detail circle B in FIG. 16.
Figure 16:
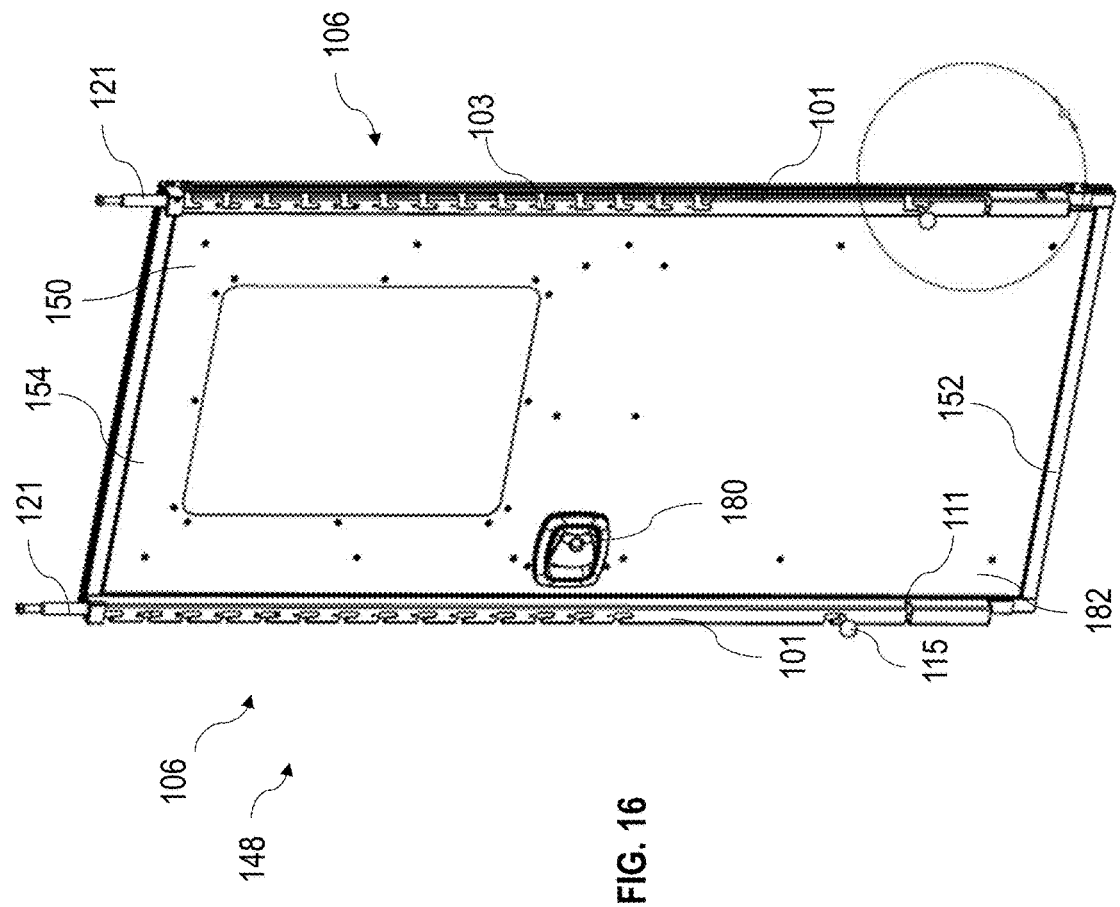
FIG. 16 illustrates the end of FIG. 14.
Figure 18:
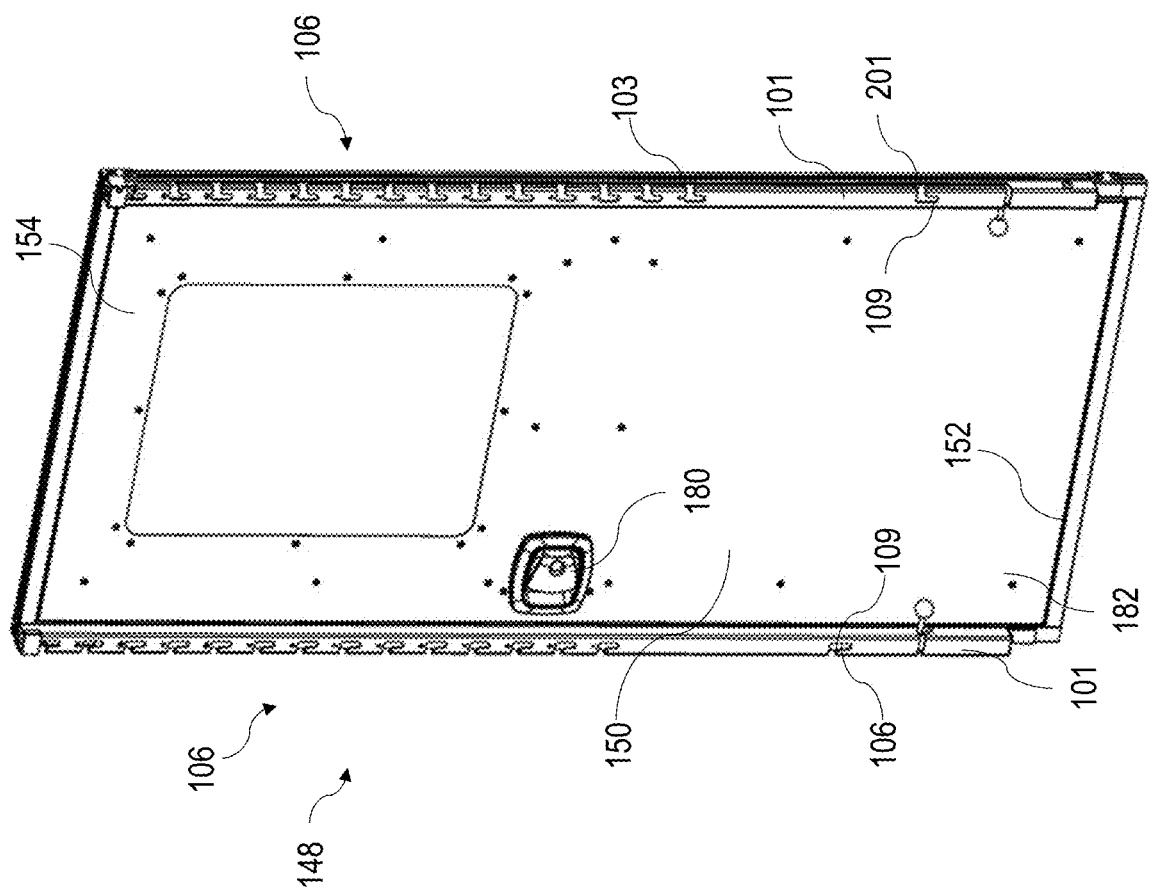
FIG. 18 illustrates the end of FIG. 14 with height adjusters in a stowed position.
Figure 19:
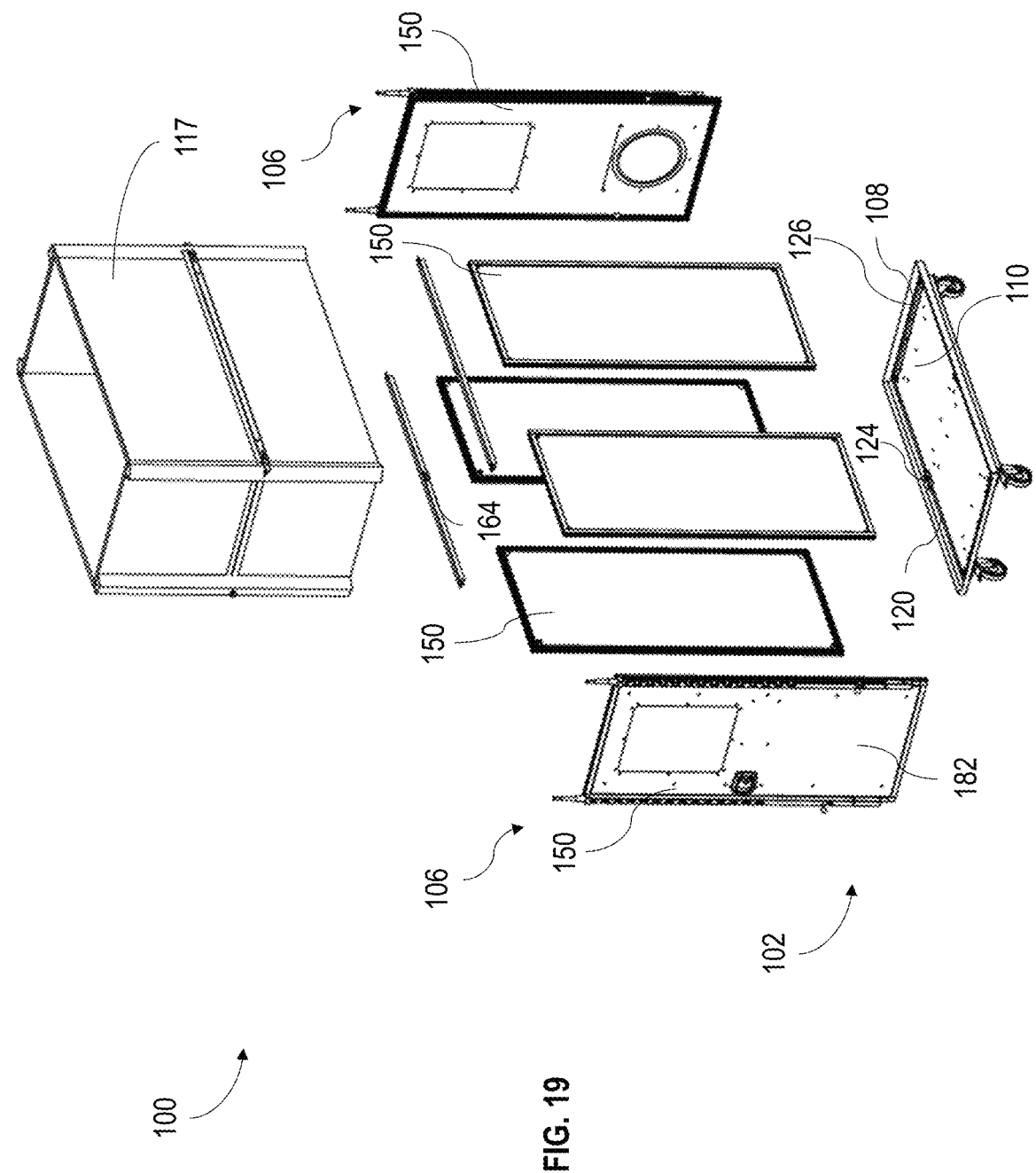
FIG. 19 is an exploded view of the maintenance cart of FIG. 1.
Figure 21:
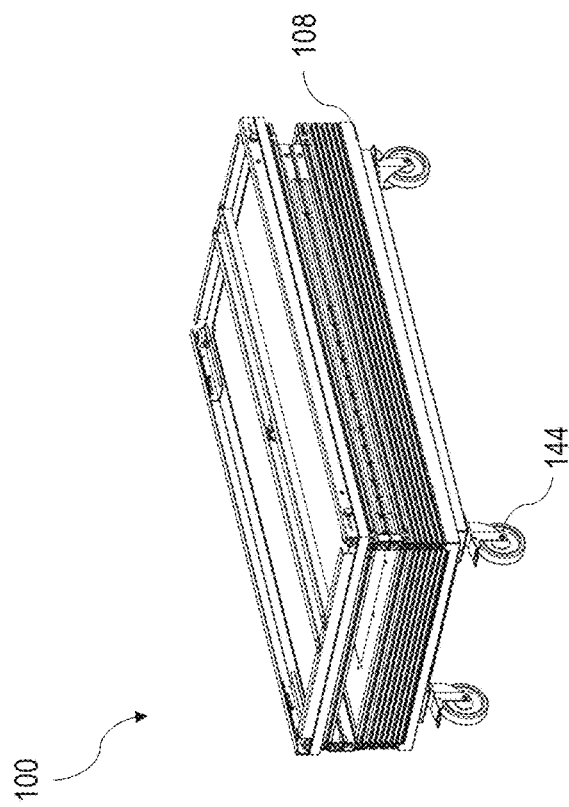
FIG. 21 illustrates the maintenance cart of FIG. 1 in the stowed configuration.

The adjustment post 101 includes a plurality of locking notches 107, a setup notch 109, and a storage notch 111 that are interconnected by a sliding groove 113. The sliding post 103 is at least partially received within the adjustment post 101 and includes an adjustment pin 115 that extends through the adjustment post 101. The adjustment pin 115 is movable along the sliding groove 113 to engage a particular one of the notches 107, 109, 111 as desired, thereby positioning the sliding post 103 at a particular height relative to the adjustment post 101. In certain embodiments, the storage notch 111 may be proximate to a lower end of the adjustment post 101, and the storage notch 111 may be provided on a side of the adjustment post 101 that is different from the notches 107 and 109 and/or otherwise face a direction that is different from the notches 107 and 109. In such embodiments, the storage notch 111 may cause the adjustment pin 115 to provide a unique visual indication (e.g., facing a different direction) that the sliding post 103 is in the stowage position. FIG. 18 illustrates an example of the adjustment pin 115 engaged with the storage notch 111. In various embodiments, the setup notch 109 may have a spacing relative to the locking notches 107 that is different from the spacing between adjacent locking notches 107. In such embodiments, the setup notch 109 may provide a unique visual indication that the sliding post 103 is in the setup position. FIGS. 16 and 17 illustrate the adjustment pin 115 engaged with the setup notch 109. The locking notches 107 may be spaced at various intervals as desired and/or have any number of notches as desired and may be various locations that the upper structure 104 can be positioned at during use.

Figure 14:
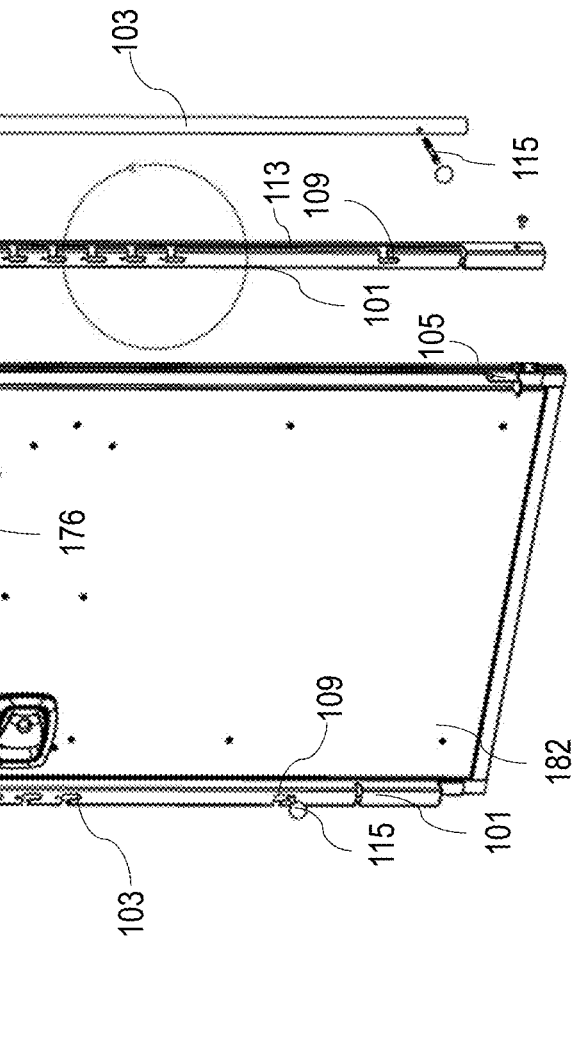
FIG. 14 illustrates an end of the maintenance cart of FIG. 1 including a door that is partially disassembled.

Optionally, and as best illustrated in FIGS. 14 and 16, the sliding post 103 includes a secondary adjuster 121 that mas allow for additional height adjustment of the upper structure 104. In certain embodiments, the secondary adjuster 121 may be biased upwards but is compressible relative to the sliding post 103. In such examples, the secondary adjuster 121 may allow for a small height adjustment of the upper structure 104 (e.g., a height adjustment less than the interval between locking notches 107) such that the upper structure 104 can maintain a desired contact with the ceiling when used. The secondary adjuster 121 may also allow improved contact between the upper structure 104 and a ceiling that is not flat.

Referring to FIGS. 1-6, for example, the maintenance cart may include a sealing member 117 connected to the upper structure 104 and the lower structure 102. In certain embodiments, the sealing member 117 may maintain an enclosed workspace 119 when the upper structure 104 is in the minimum height, maximum height, or any height between. The sealing member 117 may be various devices or materials as desired for maintaining the enclosed workspace 119. In the embodiment illustrated, the sealing member 117 is a flame-retardant fabric bellows. In some embodiments, at least a portion of one of the adjustment assemblies 106 may be retained within the workspace 119, although it need not be in other embodiments.

As mentioned, the maintenance cart 100 is adjustable between a working configuration and a stowed configuration. And as illustrated in FIGS. 1-19, in the working configuration, the upper structure 104 and the lower structure 102 together define an enclosed workspace 119 that the user can use.

FIGS. 20-25 illustrate the maintenance cart 100 in the stowed configuration. In various embodiments, in the stowed configuration, the maintenance cart 100 does not define the enclosed workspace 119, and the height of the maintenance cart is less than ½ the minimum height of the maintenance cart 100 in the working configuration. In some cases, the height of the maintenance cart 100 in the stowed configuration is less than ⅓ the minimum height of the maintenance cart 100 in the working configuration. In one non-limiting example, the height of the maintenance cart 100 in the stowed configuration is less than 60 inches, such as less than 50 inches, such as less than 40 inches, such as less than 30 inches, such as less than 20 inches.

As illustrated in FIGS. 20-25, in the stowed configuration, the panels 150 of the side assemblies 146 and the end assemblies 148 may be stacked on the base 108 such that while the panels 150 extend generally vertically relative to the base 108 in the working configuration, in the stowed configuration, the panels 150 extend generally horizontally relative to the base 108. Optionally, the entire frame assembly 152 of one of the panels 150 may be received within the receiving area 114 of the base 108 in the stowed configuration. In certain optional cases, the base 108 has a length and a width, and each panel 150 has a height and a width that is less than the length and width of the base 108 such that the panels 150 may be supported within a perimeter of the base 108 (see, e.g., FIG. 24). In one non-limiting example, the base 108 may have a length of from about 48 inches to about 72 inches, such as less than about 61 inches, and/or the base 108 may have a width of from about 18 inches to about 48 inches, such as less than about 31 inches. In other embodiments, the base 108 may have other lengths and/or widths as desired, such as less than 48 inches, greater than 72 inches, less than 18 inches, and/or greater than 48 inches. Optionally, spacers 123 may be provided on the panels 150 to facilitate positioning of the maintenance cart 100 in the stowed configuration and to minimize potential damage between adjacent panels 150. In certain embodiments, the panels 150 may be nested with each other and/or with the base 108 when in the stowed configuration.

The ability of the maintenance cart 100 to be in the stowed configuration illustrated in FIGS. 20-25 may improve storage of the maintenance cart 100 when not in use. The compact stowed configuration of the maintenance cart 100 may also facilitate movement of the maintenance cart 100 to a desired working environment. Moreover, the modular construction of the maintenance cart 100 may allow for various types of panels 150 to be assembled as desired, thereby providing a customizable maintenance cart 100 having features tailored to a particular user.

Figure 42:
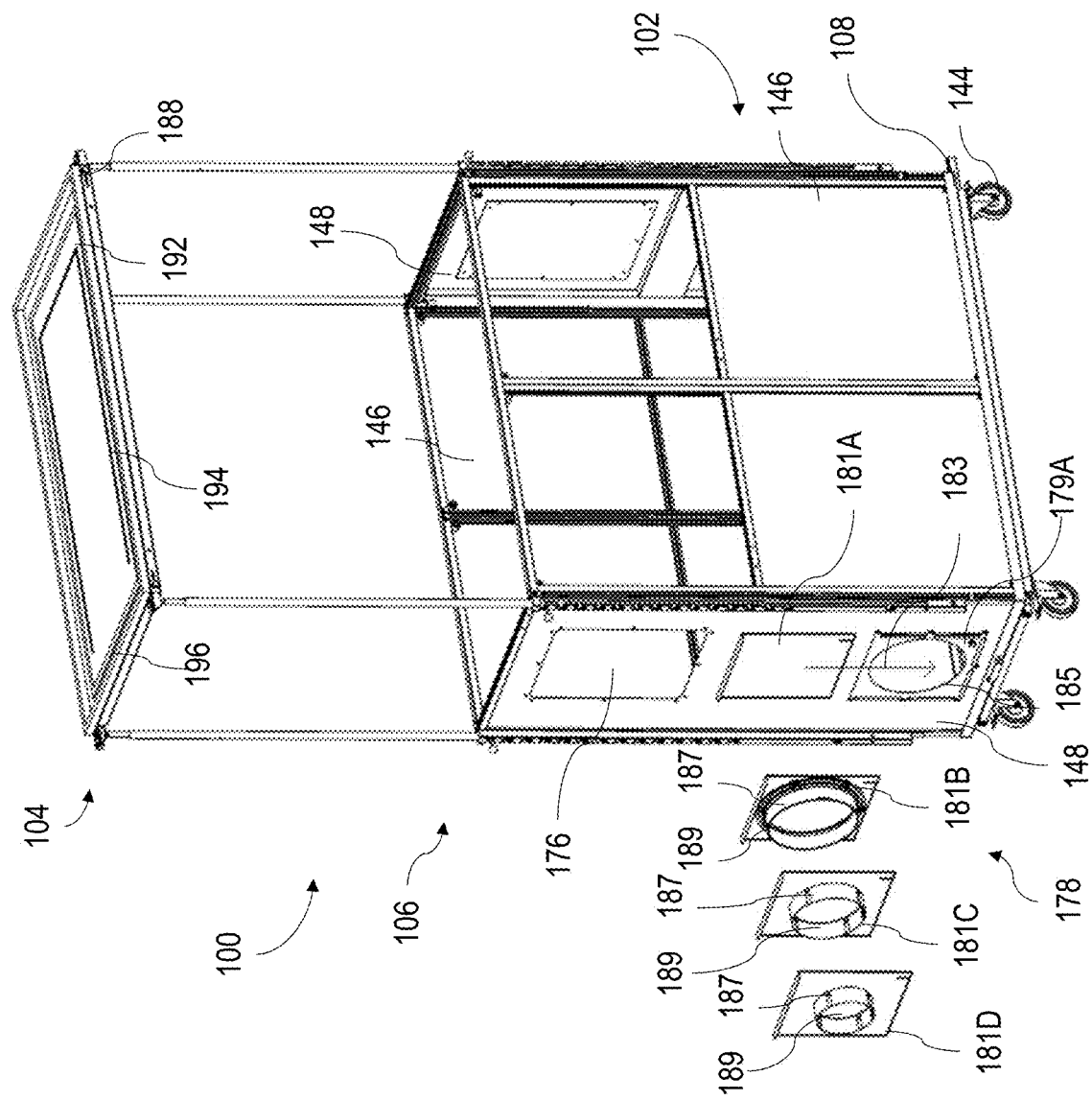
FIG. 42 illustrates the maintenance cart of FIG. 1 with a plurality of exhaust panels.
Figure 43:
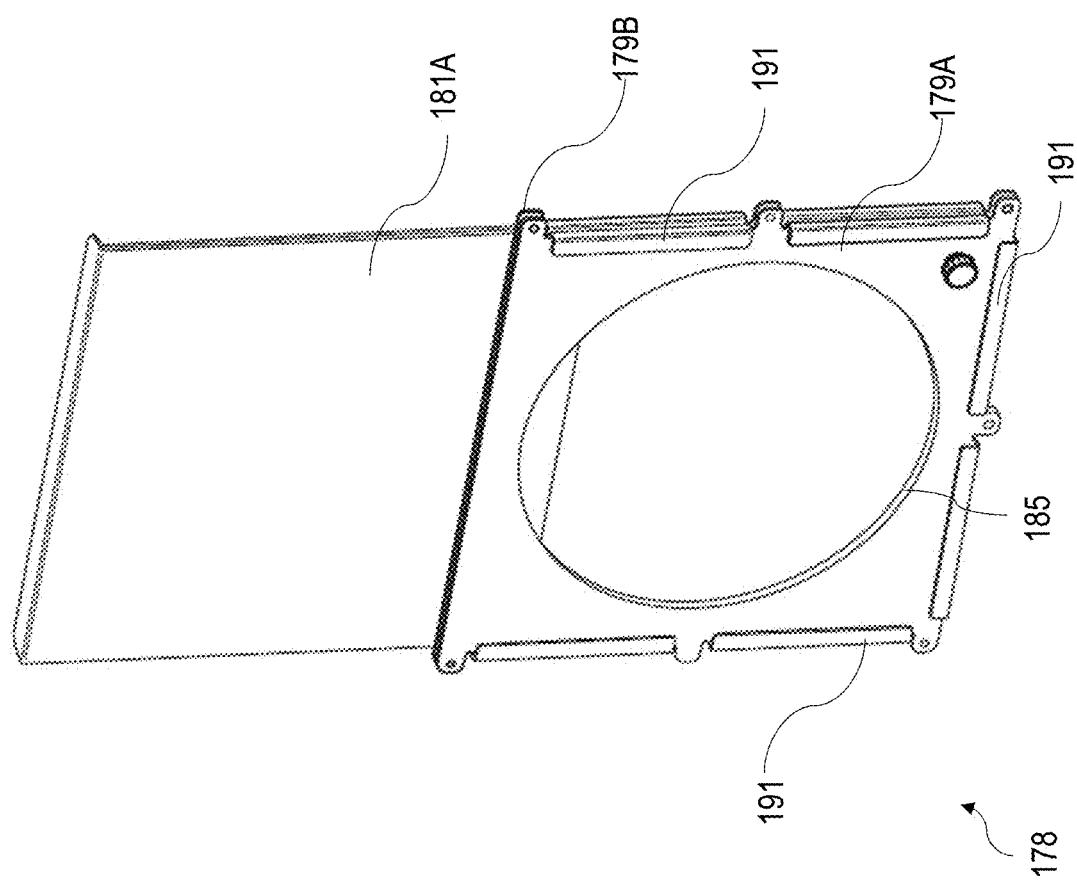
FIG. 43 illustrates one of the exhaust panels of FIG. 42 for the maintenance cart of FIG. 1.

Referring to FIGS. 42 and 43, as previously mentioned, in some embodiments, the maintenance cart 100 optionally includes one or more exhaust panel assemblies 178. In the embodiment illustrated, the exhaust panel assembly 178 is provided on one of the end assemblies 148, although in other embodiments it may be provided at other locations as desired, and in some embodiments more than one exhaust panel assembly 178 may be included.

In certain embodiments, the exhaust panel assembly 178 generally includes two panels 179A-B and a cover plate 181 that is movable relative to the panels 179A-B (represented by arrow 183 in FIG. 42). In various embodiments, the panels 179A-B defines an aperture 185. Various types of cover plates 181 may be provided with the panels 179A-B to selectively cover and/or control the flow of gas and/or air through the aperture 185 (e.g., for exhaust purposes). FIG. 42 illustrates four non-limiting examples of different cover plates 181A-D, any one of which could be used with the panel 179. In the embodiment illustrated, the cover plate 181A is a solid cover plate that obstructs the aperture 185 when positioned over the aperture 185, the cover plate 181B includes an aperture 189 and an adaptor flange 187 (e.g., for connecting with ducting, an exhaust system, etc.) having a first diameter, the cover plate 181C includes the aperture 189 and the adaptor flange 187 having a second diameter less than the first diameter, and the cover plate 181D includes the aperture 189 and the adaptor flange 187 having a third diameter less than the second diameter. In one non-limiting example, the first diameter is 12 inches, the second diameter is 10 inches, and the third diameter is 8 inches, although other diameters may be used in other embodiments.

In the embodiment illustrated, the cover plate 181 is slidable between the panels 179A-B; however, in other embodiments, it need not be. Moreover, in other embodiments, a single panel 179 may be included, and the cover plate 181 is movable relative to the single panel 179. Additionally, or alternatively, other types of exhaust panel assemblies may be utilized as desired. As same non-limiting examples, U.S. Pat. No. 10,329,760, which is hereby incorporated by reference, describes additional exhaust panel assemblies that may be used as the exhaust panel assembly 178 on the maintenance cart 100.

As best illustrated in FIG. 2, the cover plate 181 optionally includes guide channels 191 for facilitating movement and/or positioning of the cover plate 181 relative to the panels 179A-B and/or for attaching the panels 179A-B together when more than one panel 179 is provided.

Figure 45:
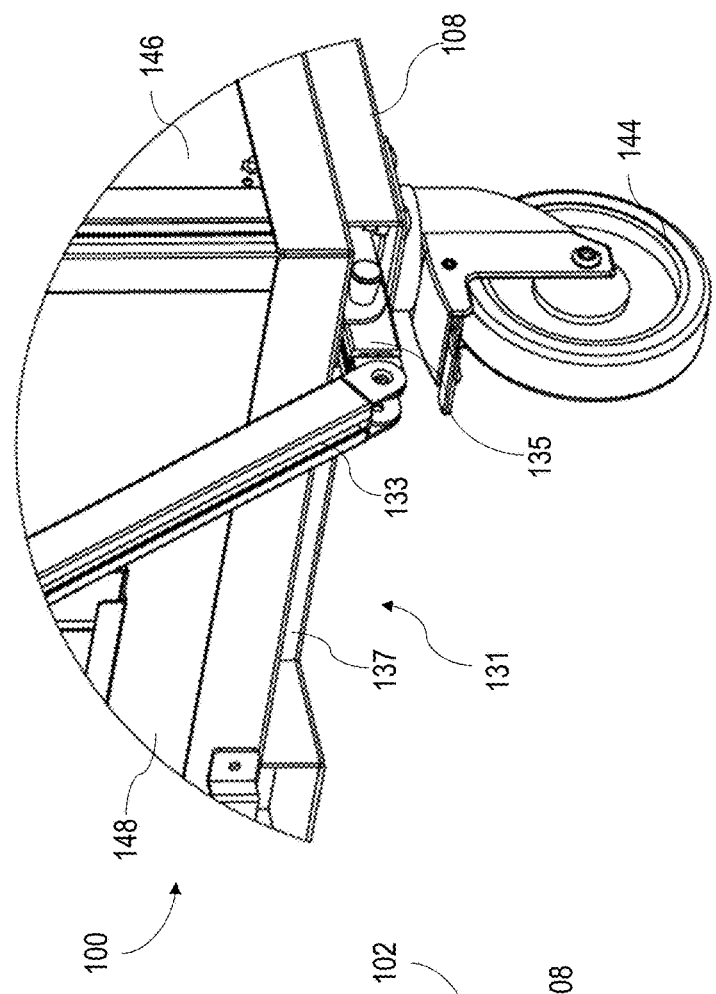
FIG. 45 illustrates the maintenance cart of FIG. 1 taken from detail circle G in FIG. 44.
Figure 44:
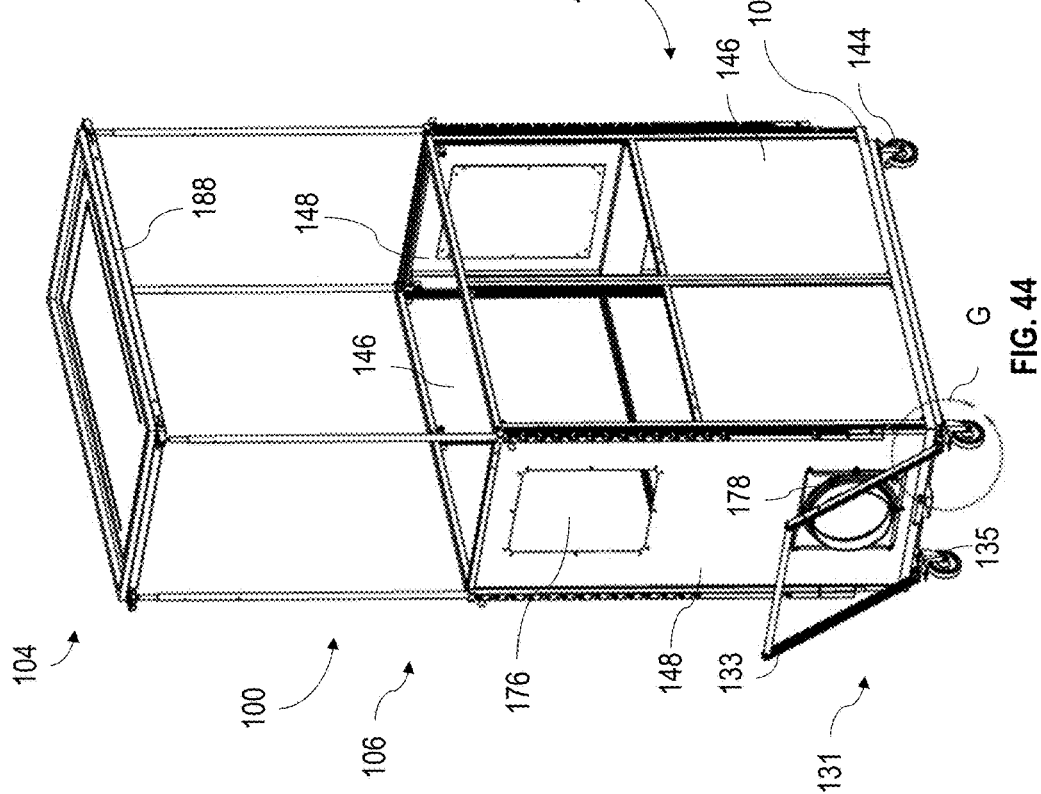
FIG. 44 illustrates the maintenance cart of FIG. 1 with a handle.
Figure 47:
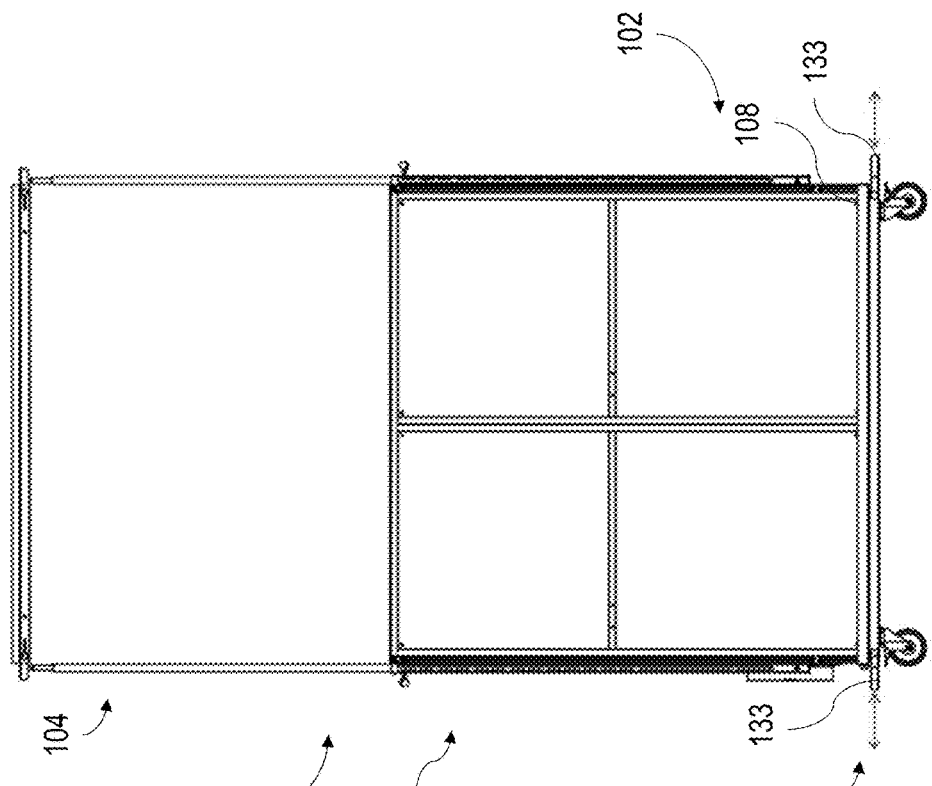
FIG. 47 illustrates the maintenance cart of FIG. 1 with the handle of FIG. 44 in a stowed position.
Figure 46:
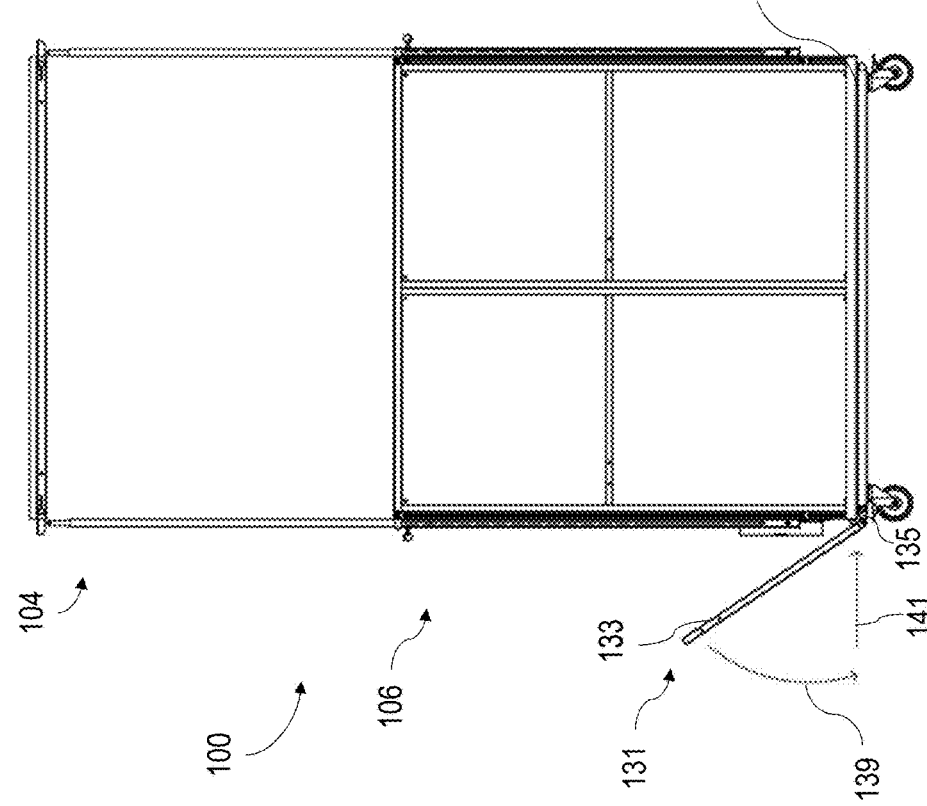
FIG 46 is another view of the maintenance cart of FIG. 1 with the handle of FIG. 44 and the handle in a deployed position.
Figure 49:
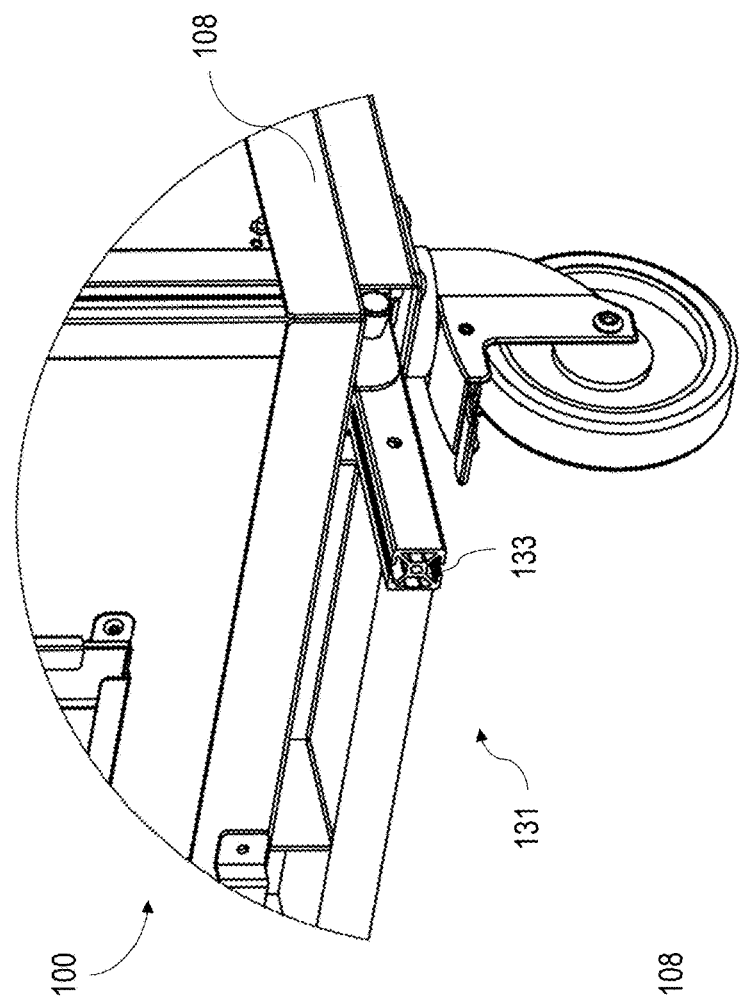
FIG. 49 illustrates the maintenance cart of FIG. 1 taken from detail circle H in FIG. 48.

Referring to FIGS. 44-49, in some optional embodiments, the maintenance cart 100 includes a handle assembly 131. The handle assembly 131 may include at least one first handle 133 and at least one second handle 135. Optionally, the handle assembly 131 includes first handles 133 provided on opposite sides of the base 108. In certain embodiments, the at least one second handle 135 is supported on the base 108 such that the second handle 135, and thus the handle assembly 131 is movable relative to the base 108. In the embodiment illustrated, the second handle 135 is attached to the base 108 such that the second handle 135 is slidable relative to the base 108 (represented by arrow 141 in FIG. 46). In certain aspects, and as best illustrated in FIGS. 45 and 49, the second handle 135 may be supported on a bottom side 137 of the base 108, although it need not be in other embodiments.

In various embodiments, the first handle 133 is movable attached to the second handle 135 such that an orientation of the first handle 133 relative to the second handle 135 is adjustable as desired. In the embodiment illustrated, the first handle 133 is pivotably attached to the second handle 135 such that an angle of the first handle 133 relative to the second handle 135 is adjustable (e.g., represented by arrow 139 in FIG. 46).

Figure 48:
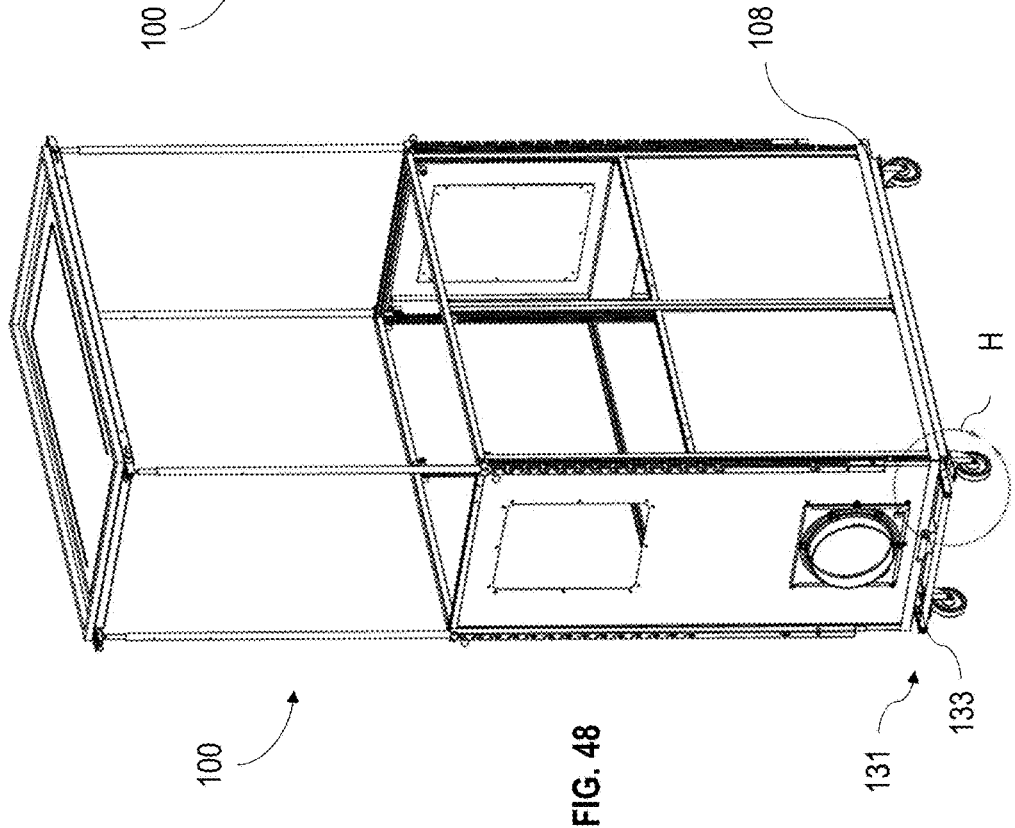
FIG. 48 illustrates the maintenance cart of FIG. 1 with the handle in the stowed position.
Figure 51:
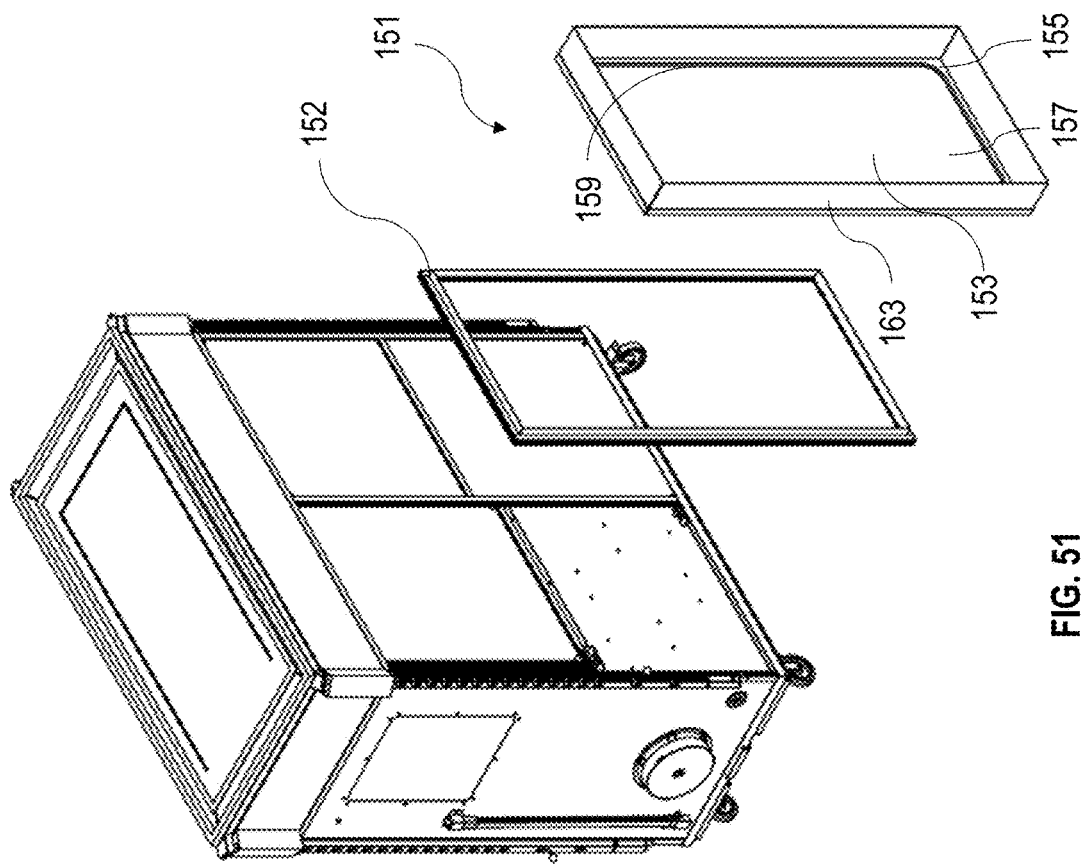
FIG. 51 is another view of the maintenance cart of FIG. 1 with the side wall access panel of FIG. 50.
Figure 50:
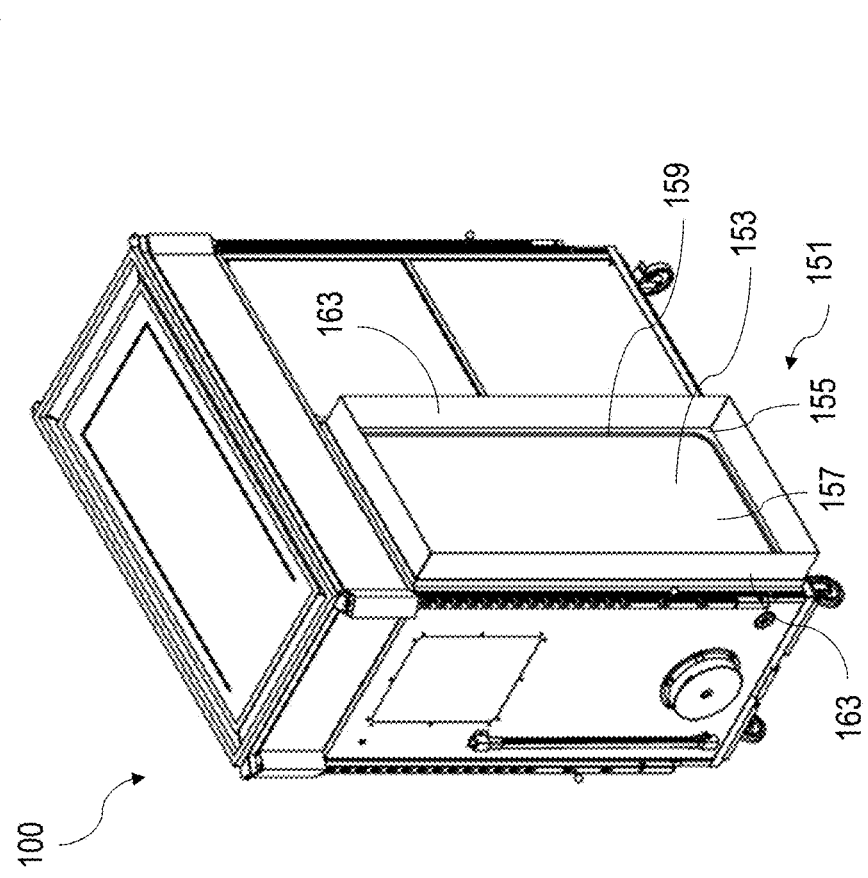
FIG. 50 illustrates the maintenance cart of FIG. 1 with a side wall access panel according to embodiments.
Figure 53:
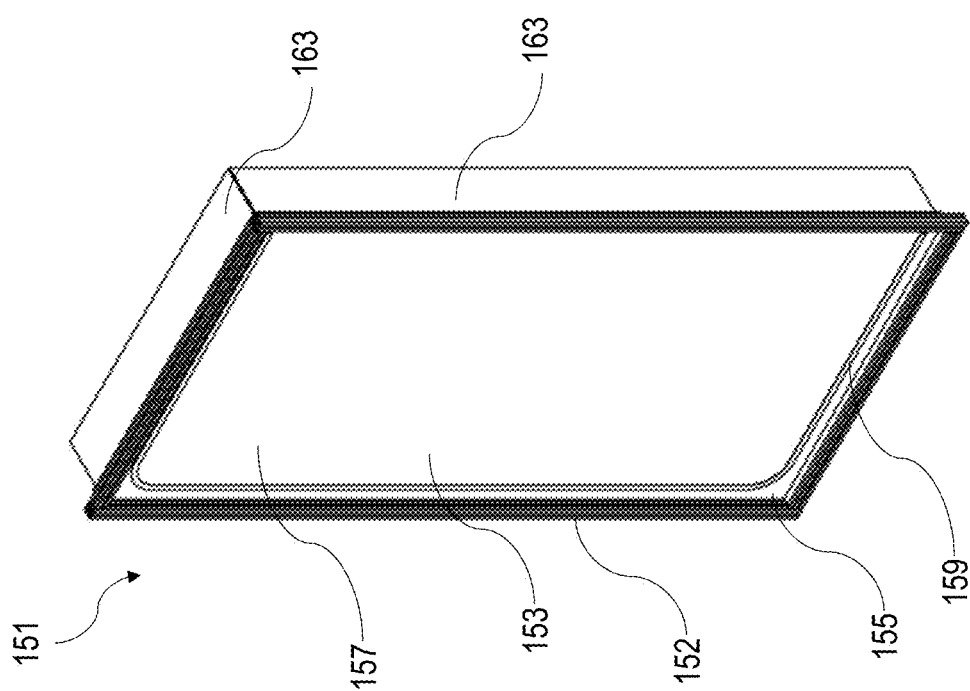
FIG. 53 illustrates the side wall access panel of FIG. 50 with a frame assembly.
Figure 52:
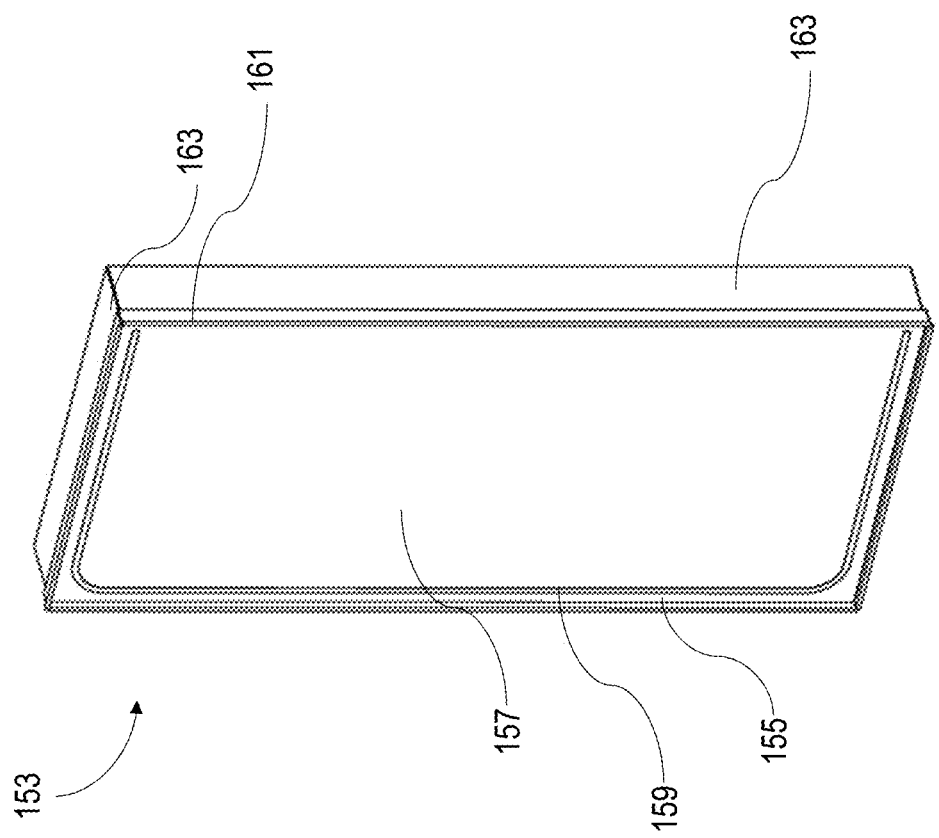
FIG. 52 illustrates the side wall access panel of FIG. 50.

In certain embodiments, the handle assembly 131 is supported on the maintenance cart 100, such as on the base 108, such that the handle assembly 131 is adjustable between a stowed configuration (see, e.g., FIG. 47) and a deployed configuration (see, e.g., FIG. 48). In certain embodiments, in the stowed configuration, the second handle 135 may be moved (e.g., slid) relative to the base 108 such that at least a portion of the first handle 133 is retracted into the base 108 and/or below the bottom side 137. In the deployed configuration, the second handle 135 may extend outwards from one or both ends of the base 108, which may permit the first handle 133 to nose (e.g., pivot) relative to the second handle 135 to a desired orientation. The handle assembly 131 movable between the stowed configuration and the deployed configuration may allow for the handle assembly 131 to be selectively used by a user (e.g., to move the cart 100 to a desired location) and stowed in a compact configuration when the maintenance cart 100 is not in use. In some cases, the handle assembly 131 optionally supported on the bottom side 137 may minimize potential interference with the stowage of the other components of the maintenance cart 100 in the stowed configuration (e.g., as illustrated in FIGS. 20-25). Moreover, the handle assembly 131 may be deployed while the other components remain in the stowed configuration such that a user may use the handle assembly 131 to move the maintenance cart 100 regardless of whether the other components are in the working configuration or the stowed configuration. In other embodiments, other types of handle assemblies may be used with the maintenance cart 100 as desired, and in other embodiments, a handle assembly may be omitted.

Referring to FIGS. 50-53, in some optional embodiments, the maintenance cart 100 includes a side wall access panel assembly 151 that provides access to the interior workspace of the maintenance cart 100 through one or more side assemblies 146.

The side wall access panel assembly 151 includes a frame assembly 152 and a flexible or non-rigid panel 153. The non-rigid panel 153 may be constructed from various materials as desired, including but not limited to various fabrics, sheets, panels, etc. as desired. In one non-limiting example, the non-rigid panel 153 may be a flame-resistant fabric. Additionally, or alternatively, the non-rigid panel 153 may be constructed from an easy to clean material, such as various plastic sheets, fabrics, etc.

As illustrated in FIGS. 50-53, the non-rigid panel 153 may include a body 155 and a door 157. A portion of the door 157 may be continuous with the body 155, and another portion of the door 157 includes an edge 159 that may be selectively attached to or detached from the body 155 using various mechanisms as desired, such as but not limited to zippers, clips, clasps, hook and loop fasteners, etc. In various embodiments, when the edge 159 is detached from the body 155, an opening may be defined in the non-rigid panel 153 that a user may use to enter and/or exit the interior workspace of the maintenance cart 100. Optionally, the non-rigid panel 153 includes a holder 161 that may be used to hold a portion of the door 157 when the edge 159 is detached from the body 155. The holder 161 may be various suitable devices or mechanisms as desired, such as but not limited to clips, clasps, straps, hook and loop fasteners, etc.

Optionally, the side wall access panel assembly 151 includes flaps 163 along at least a portion of the frame assembly 152. As illustrated, the flaps 163 may extend outwards from the maintenance cart 100. In certain embodiments, the flaps 163 are adjustable between a deployed position (e.g., as illustrated in FIGS. 50-53) and a stowed position in which the flaps 163 are folded and/or lay flat against the non-rigid panel 153. In various embodiments, in the folded position, the flaps 163 may project outwards from the maintenance cart 100 less than they do in the deployed position. The flaps 163 may be constructed from various materials as desired. Optionally, the flaps 163 may be constructed from the same material as the non-rigid panel 153, although they need not be in other embodiments. In certain embodiments, the flaps 163 optionally may be a transparent or translucent material, although they need not be in other embodiments. When included, the flaps 163 may provide directionality for entering the maintenance cart 100 via the side wall access panel assembly 151 and may provide a barrier and/or additional protection to the opening when the door 155 is in the detached configuration.

Referring to FIGS. 26-41, a method of changing the maintenance cart 100 from the stowed configuration to the working configuration is provided below. It will be appreciated that a method of changing the maintenance cart 100 from the working configuration to the stowed configuration could be performed in the reverse order of steps discussed below.

Figure 26:
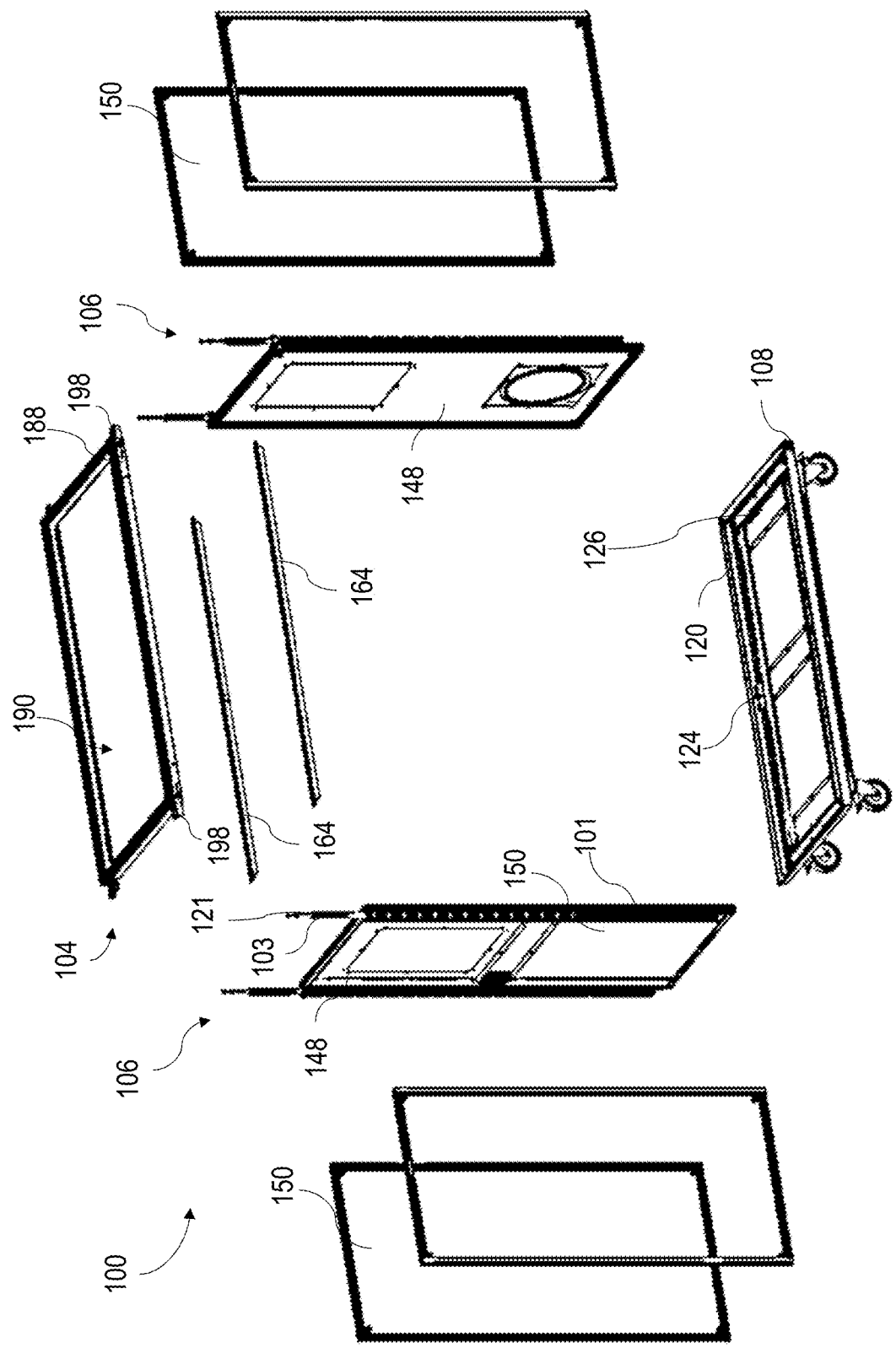
FIG. 26 is another exploded view of the maintenance cart of FIG. 1.
Figure 28:
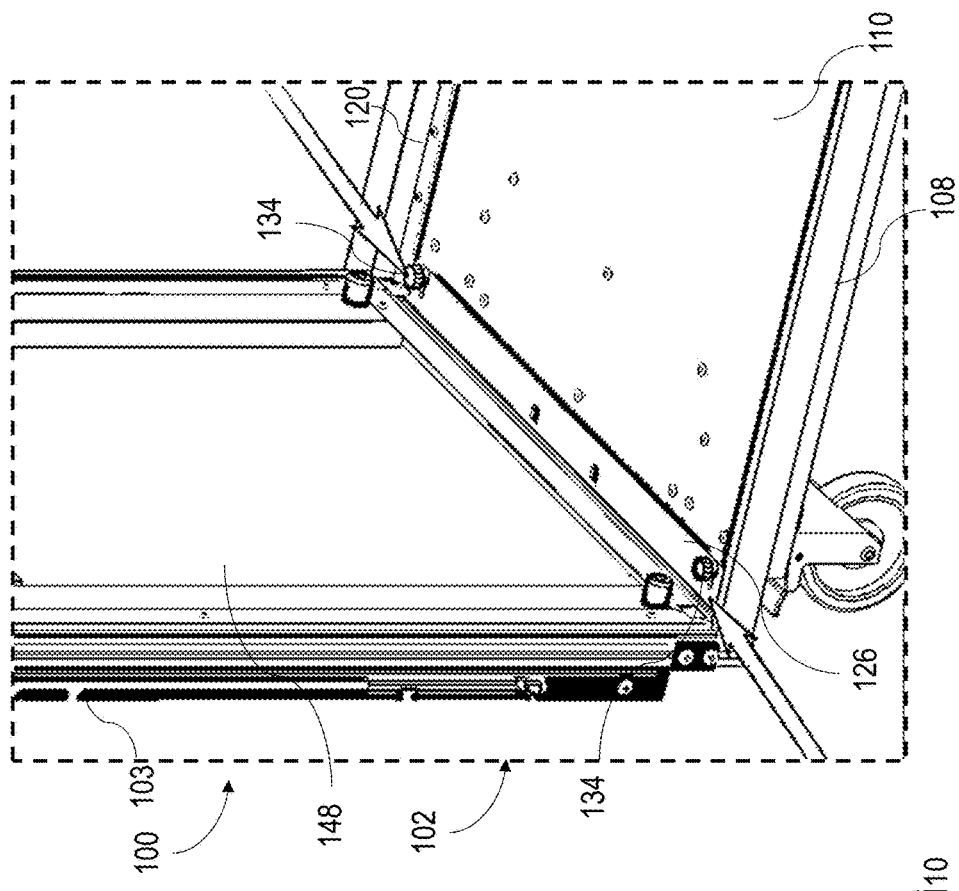
FIG. 28 illustrates another step for changing the maintenance cart of FIG. 1 from the stowed configuration to the working configuration.
Figure 27:
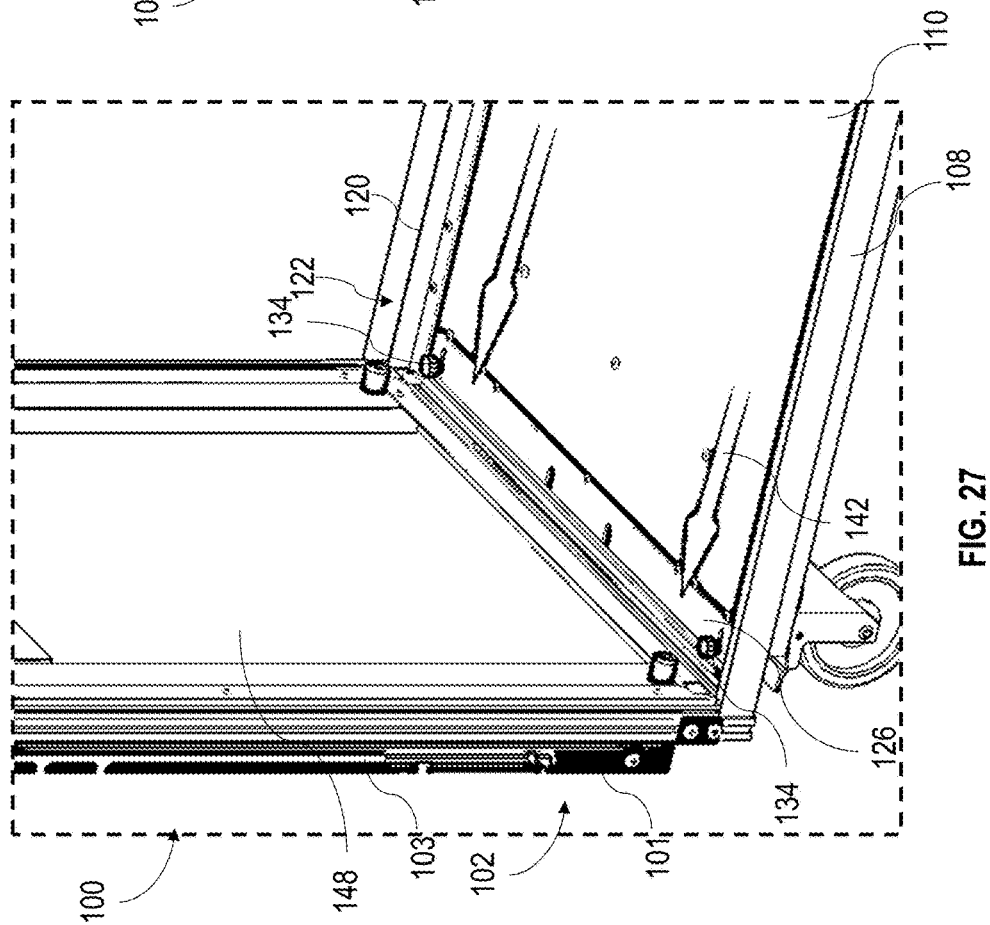
FIG. 27 illustrates a step of a process for changing the maintenance cart of FIG. 1 from the stowed configuration to a working configuration.
Figure 29:
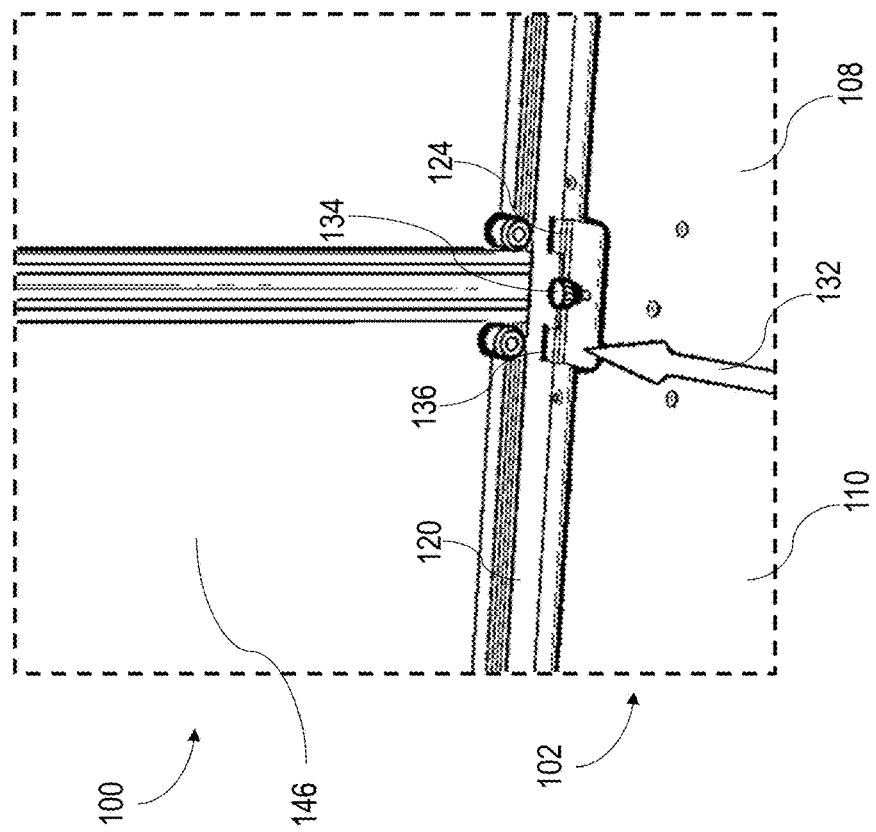
FIG. 29 illustrates another step for changing the maintenance cart of FIG. 1 from the stowed configuration to the working configuration.
Figure 32:
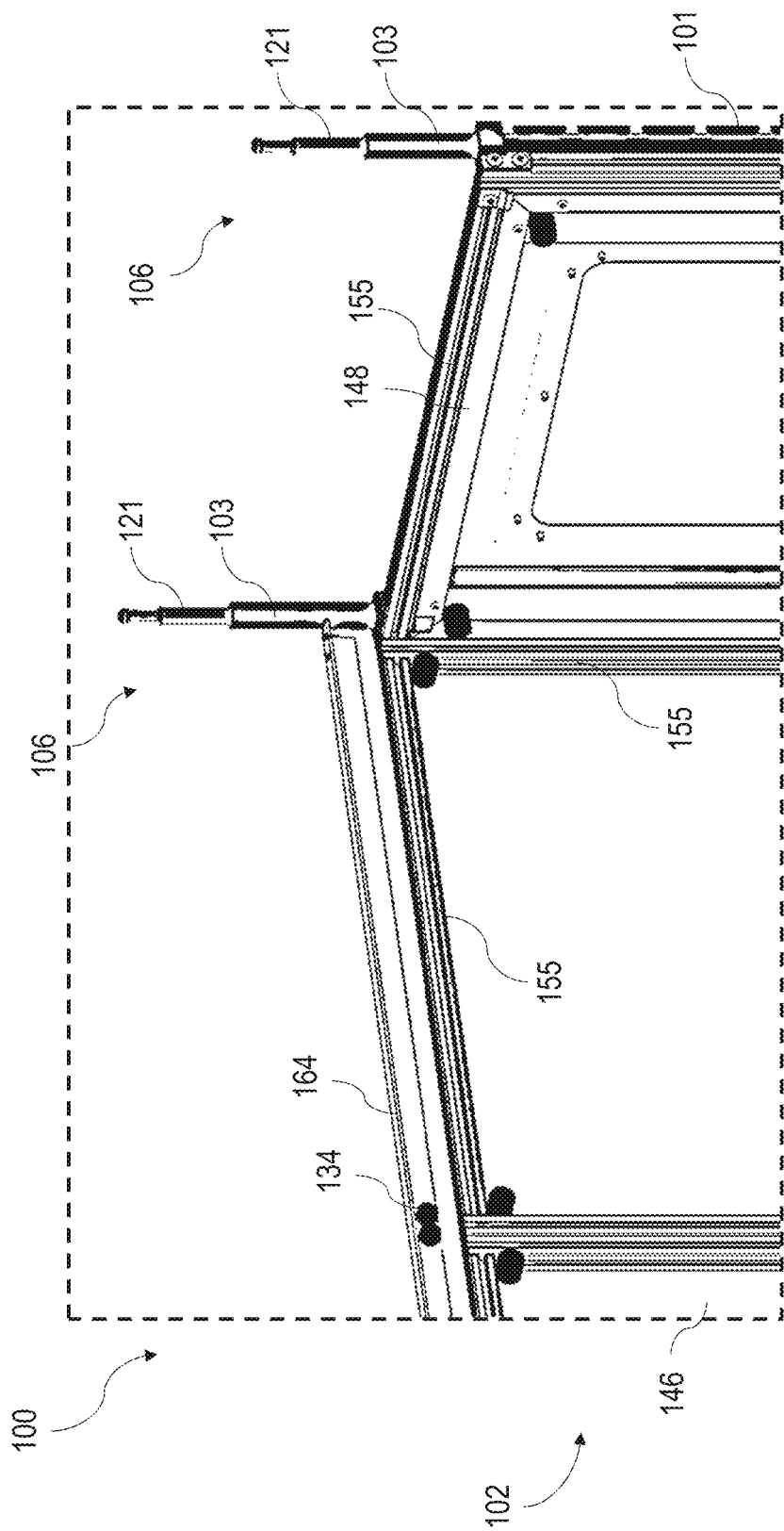
FIG. 32 illustrates another step for changing the maintenance cart of FIG. 1 from the stowed configuration to the working configuration.

Referring to FIG. 26, the method may include removing upper structure 104 and the panels 150 forming the lower structure 102 from the base 108. Referring to FIGS. 28 and 29, the method may include assembling one of the end assemblies 148 with the base 108 by sliding the end-sliding bracket 126 to a desired position within the receiving area 114 (FIG. 27) and adjusting the adjusters 134 to secure the end-sliding bracket 126 at the desired position (FIG. 28). The method may include lowering the end assembly 148 into the receiving area 114 and such that the insert 140 of the end-sliding bracket 126 is positioned within a bottom facing channel 160 of the lower strut 155 of the frame assembly 152 of the end assembly 148.

Figure 30:
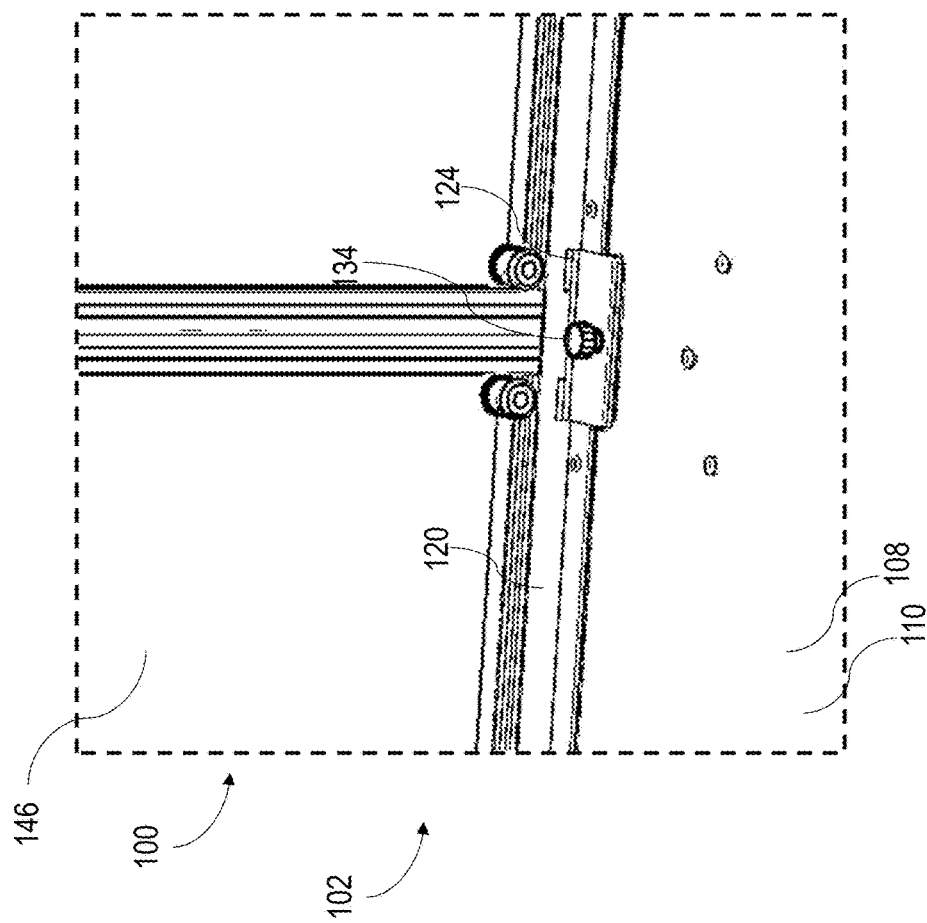
FIG. 30 illustrates another step for changing the maintenance cart of FIG. 1 from the stowed configuration to the working configuration.

Referring to FIGS. 29 and 30, the method may include assembling one of the side assemblies 146 with the base 108 by positioning two panels 150 within the channel 122 between the channel wall 120 and the perimeter wall 112. The method may include sliding the side-sliding bracket 124 within the receiving area 114 such that the inserts 130 engage the channel wall 120 and the lower struts 155 of the panels 150 (FIG. 29). In some embodiments, one insert 130 of the side-sliding bracket 124 engages a sideways-facing channel 160 of the strut 155 of one of the panels 150 and the other insert 130 engages a sideways-facing channel 160 of the strut 155 of the other one of the panels 150. The method may include adjusting the adjuster 134 to secure the positioning of the side-sliding bracket 124 relative to the base 108, the channel wall 120, and the side assembly 146 (FIG. 30).

Referring to FIG. 31, the method illustrated in FIGS. 27-30 may be repeated for the other side assembly 146 and the other end assembly 148. The order in which the side assemblies 146 and end assemblies 148 are assembled with the base 108 should not be considered limiting on the disclosure.

Figure 34:
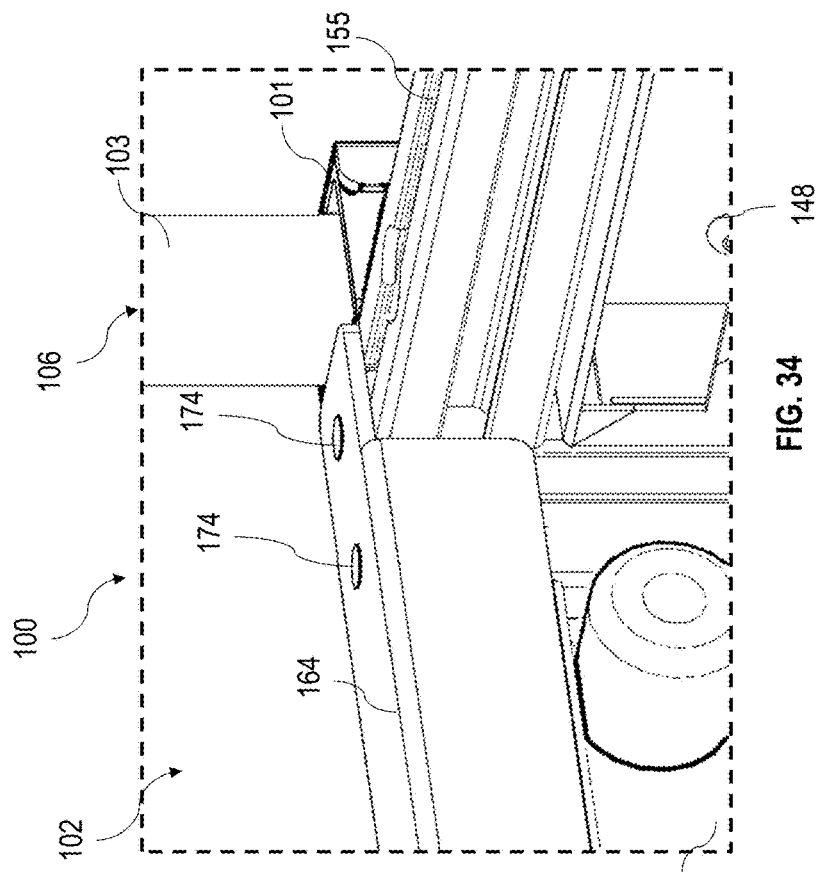
FIG. 34 illustrates another step for changing the maintenance cart of FIG. 1 from the stowed configuration to the working configuration.
Figure 33:
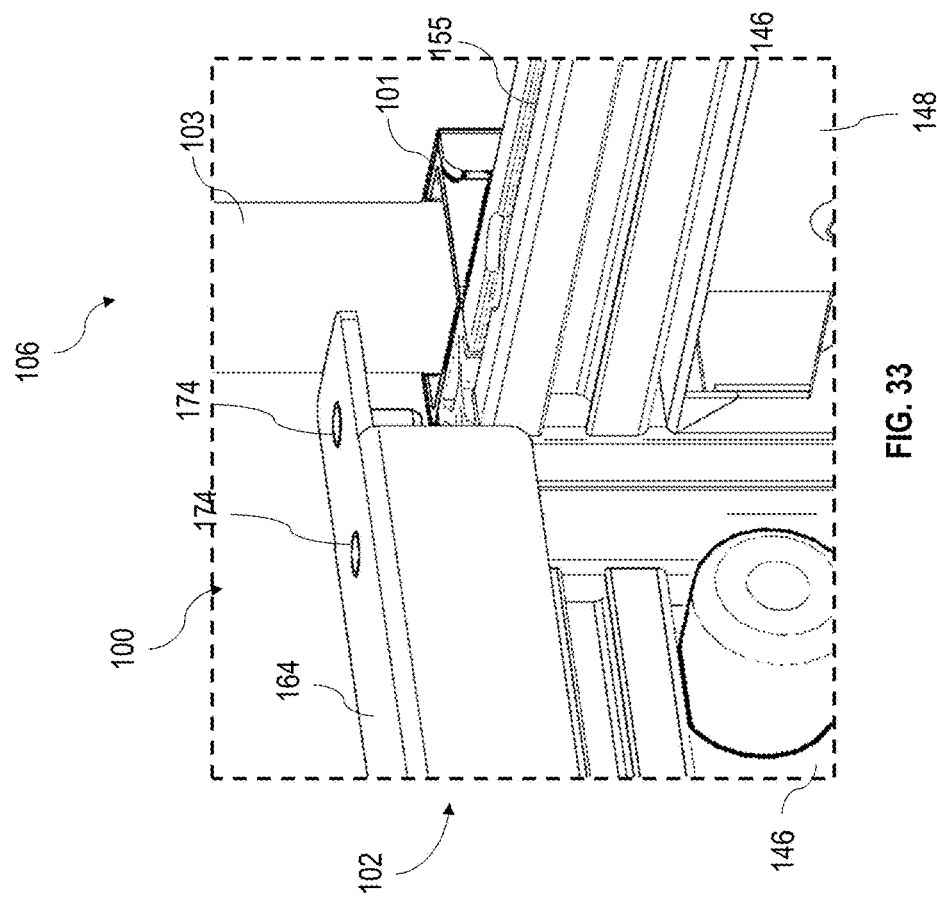
FIG. 33 illustrates another step for changing the maintenance cart of FIG. 1 from the stowed configuration to the working configuration.
Figure 36:
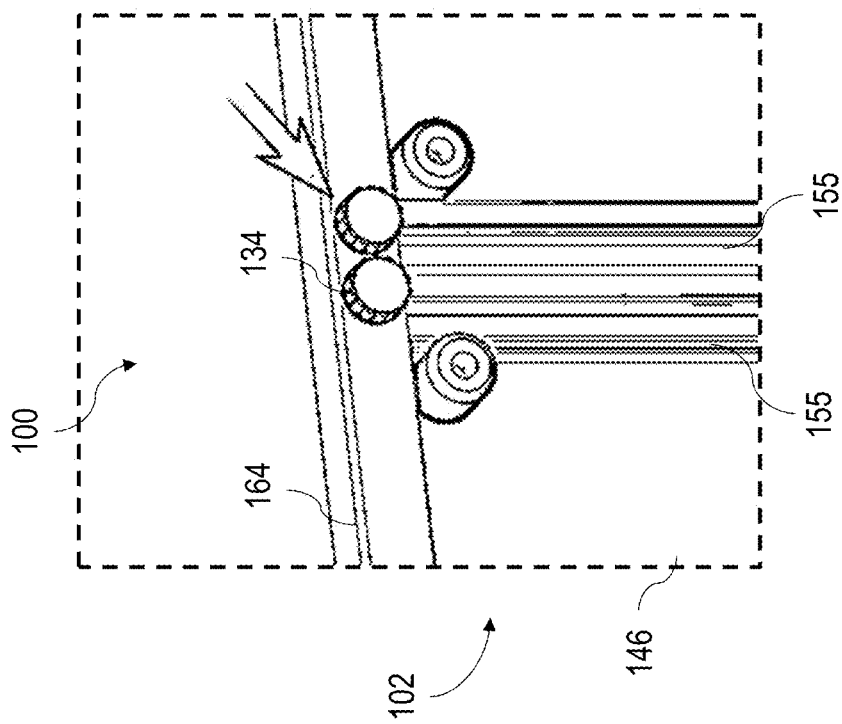
FIG. 36 illustrates another step for changing the maintenance cart of FIG. 1 from the stowed configuration to the working configuration.
Figure 35:
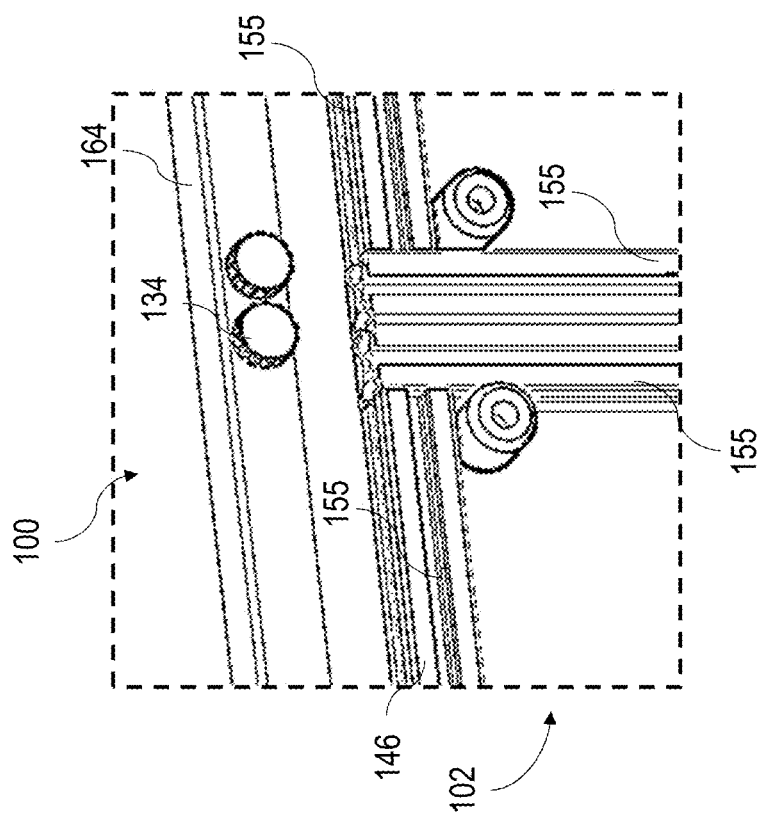
FIG. 35 illustrates another step for changing the maintenance cart of FIG. 1 from the stowed configuration to the working configuration.

Referring to FIGS. 32-36, the method includes securing adjacent panels 150 using the top support bars 164. As illustrated in FIGS. 33-36, in some embodiments, the method includes using the top support bar 164 to connect adjacent panels of the side assembly 146 and an adjacent side assembly 146 and an end assembly 148 by inserting upper struts 155 of the side assembly 146 into the receiving area 170 of the top support bar 164. The method may include positioning studs 174 in an aperture 158 of the end assembly 148 and in an aperture 158 of the side assembly 146 and connecting the side assembly 146 with the end assemble 148 (FIGS. 33 and 34). The method may include positioning inserts 172 of the top support bar 164 within channels 160 of struts 155 of the panels 150 and adjusting the adjusters 134 to secure the top support bar 164 relative to the panels 150 (FIGS. 35 and 36).

Figure 37:
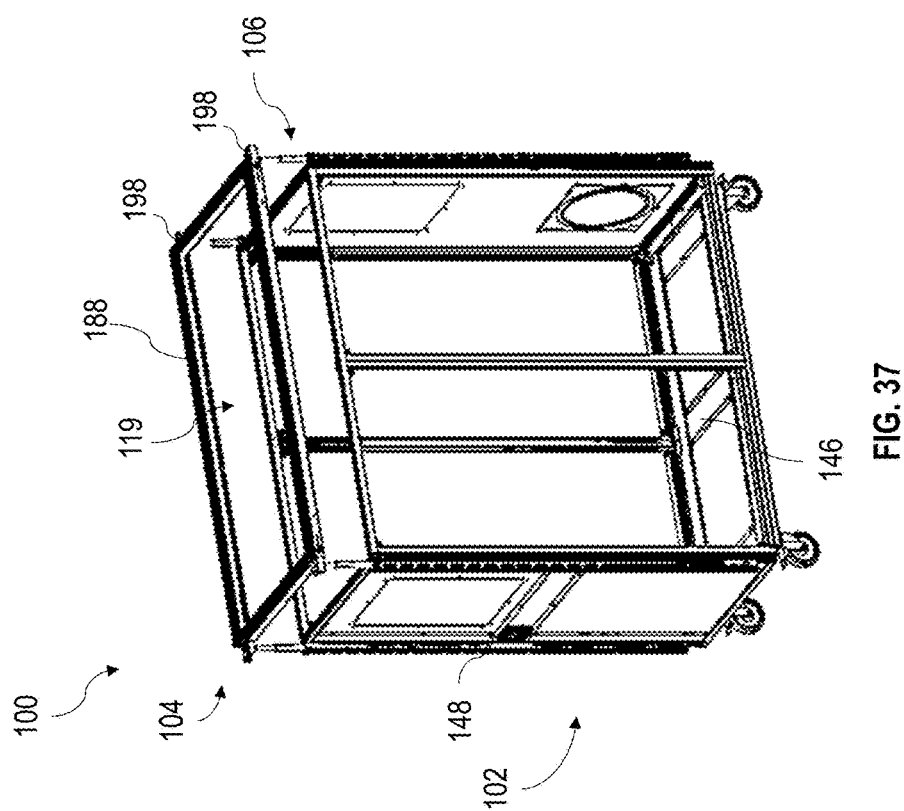
FIG. 37 illustrates another step for changing the maintenance cart of FIG. 1 from the stowed configuration to the working configuration.

Referring to FIG. 37, the method may include controlling the adjustment assemblies 106 to be in the setup position, moving the brackets 198 of the support 188 of the upper structure 104 to the deployed position, and engaging the brackets 198 with the sliding post 103. Optionally, engaging the brackets 198 with the sliding post 103 includes engaging the brackets 198 with the secondary adjusters 121 on the sliding posts 103. In FIG. 37, at least the lower structure 102 defines the enclosed workspace 119.

Figure 38:
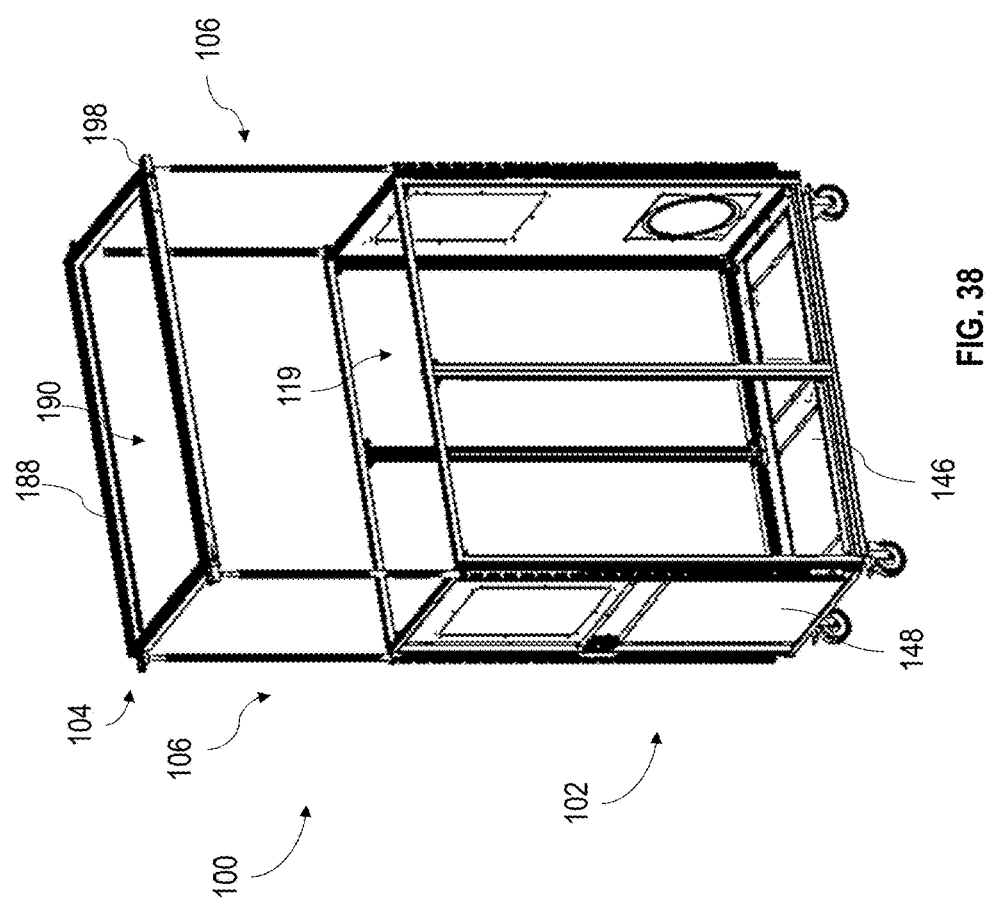
FIG. 38 illustrates another step for changing the maintenance cart of FIG. 1 from the stowed configuration to the working configuration.
Figure 40:
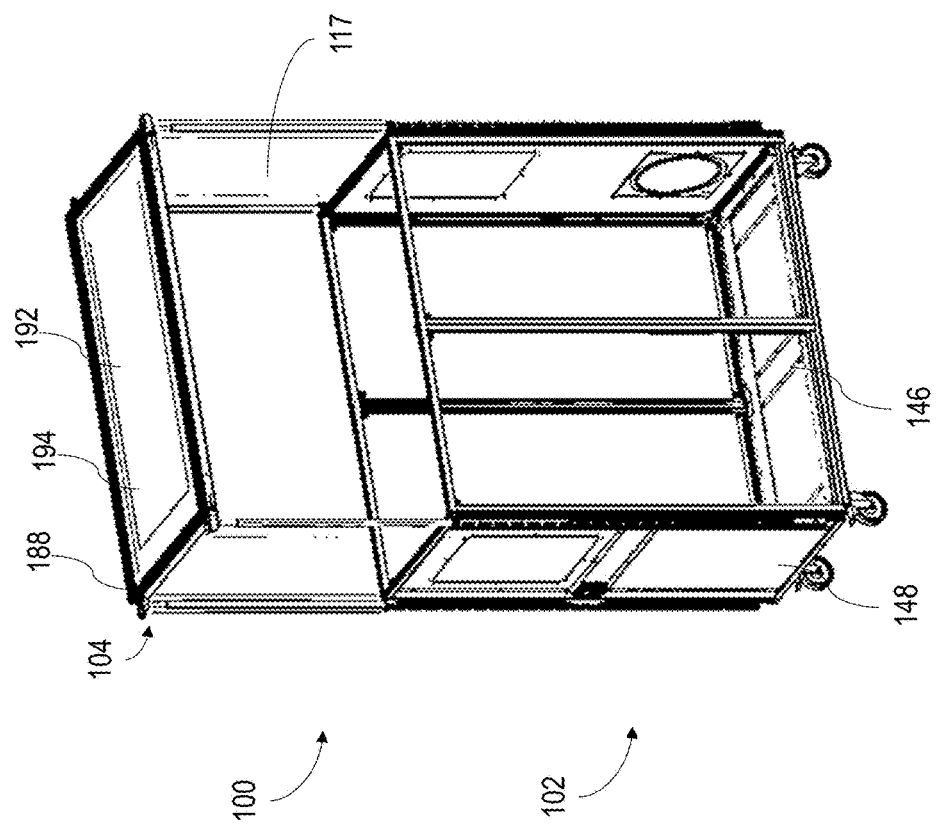
FIG. 40 illustrates another step for changing the maintenance cart of FIG. 1 from the stowed configuration to the working configuration.
Figure 39:
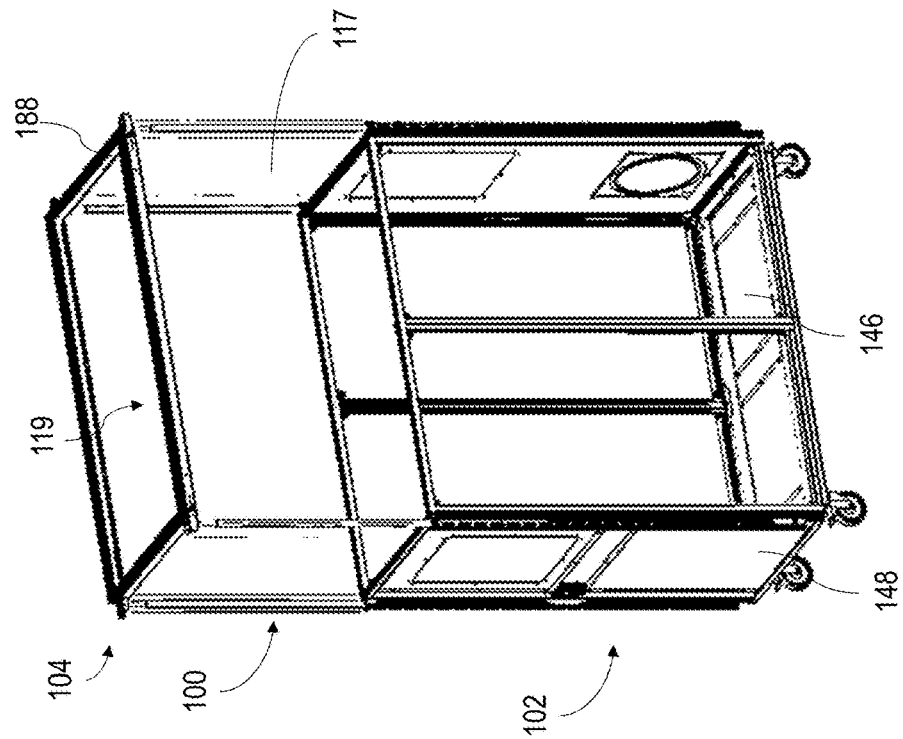
FIG. 39 illustrates another step for changing the maintenance cart of FIG. 1 from the stowed configuration to the working configuration.
Figure 41:
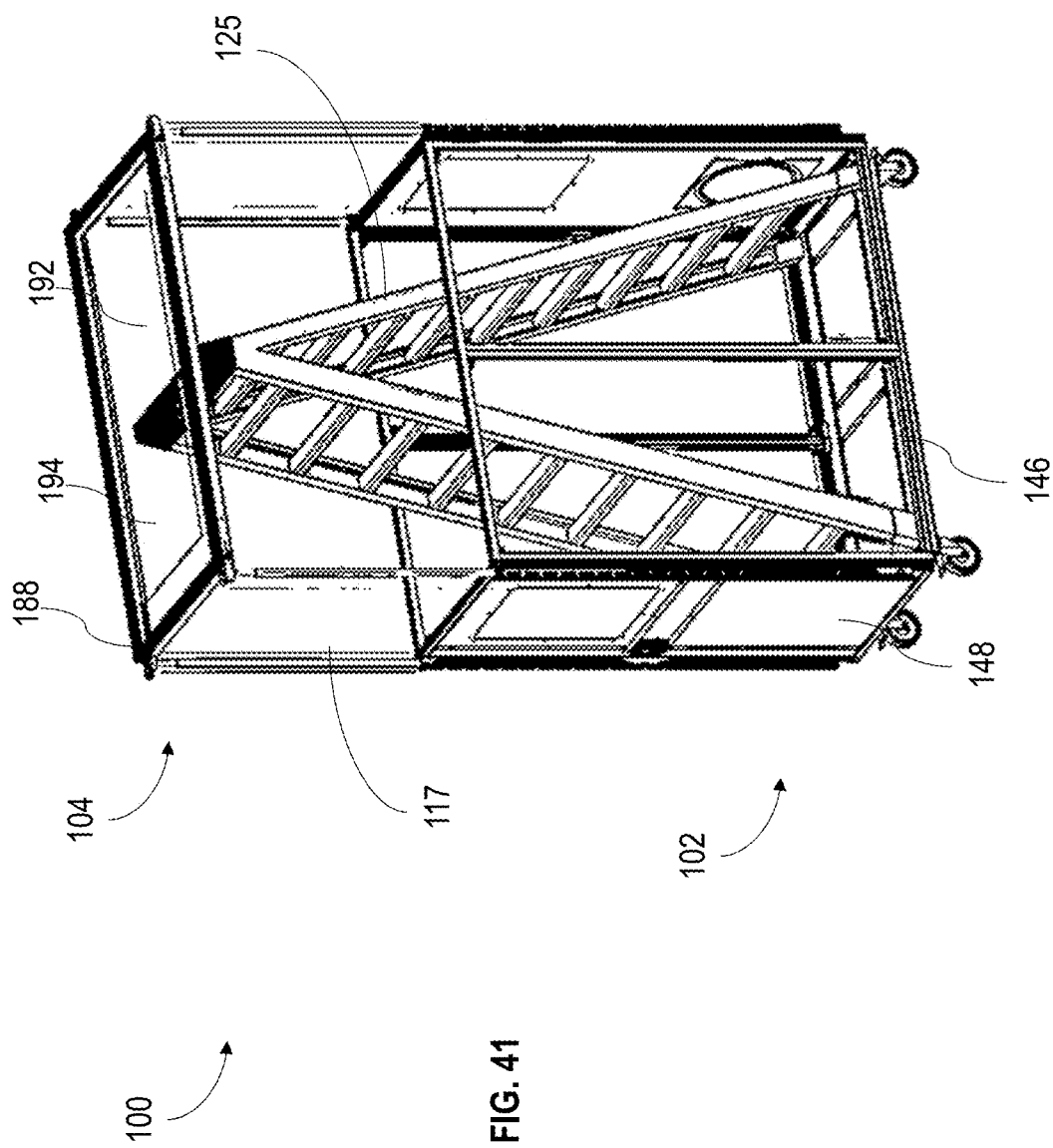
FIG. 41 illustrates another step for changing the maintenance cart of FIG. 1 from the stowed configuration to the working configuration.

Referring to FIGS. 38-40, the method may include raising the upper structure 104 relative to the lower structure 102 using the adjustment assemblies 106 (FIG. 38), and optionally attaching the sealing member 117 to the upper structure 104 and the lower structure 102 such that the upper structure 104, the lower structure 102, and the sealing member 117 define the enclosed workspace 119 (FIG. 39). The method may include supporting the cover 192 on the support 188 of the upper structure 104. As illustrated in FIG. 41, once the maintenance cart 100 is in the working configuration, a ladder 125 may be provided within the workspace 119 for a user to use as desired.

ILLUSTRATIONS

A collection of exemplary embodiments is provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A collapsible maintenance cart comprising: a lower structure; and an upper structure, wherein the collapsible maintenance cart is movable between a stowed configuration and a working configuration, wherein, in the working configuration, the lower structure and the upper structure together define an interior workspace and the upper structure is movable relative to the lower structure such that the collapsible maintenance cart comprises a raised position and a lowered position, and wherein, in the stowed configuration, a height of the collapsible maintenance cart in the stowed configuration is less than ½ a height of the collapsible maintenance cart in the lowered position of the working configuration.

Illustration 2. The collapsible maintenance cart of any preceding or subsequent illustrations or combination of illustrations, wherein the height of the collapsible maintenance cart in the stowed configuration is less than ⅓ the height of the collapsible maintenance cart in the lowered position of the working configuration.

Illustration 3. The collapsible maintenance cart of any preceding or subsequent illustrations or combination of illustrations, wherein the height of the collapsible maintenance cart in the stowed configuration is less than 20 inches, and wherein the height of the collapsible maintenance cart in the lowered position of the working configuration is at least 72 inches.

Illustration 4. The collapsible maintenance cart of any preceding or subsequent illustrations or combination of illustrations, wherein the lower structure comprises: a base comprising a raised perimeter wall defining a receiving area of the base; and a plurality of side panels, each side panel of the plurality of side panels comprising a frame and a panel body, wherein, in the working configuration, a bottom portion of the frame of each side panel is positioned within the receiving area of the base, and wherein, in the stowed configuration, the frame of one side panel of the plurality of side panels is positioned within the receiving area of the base.

Illustration 5. The collapsible maintenance cart of any preceding or subsequent illustrations or combination of illustrations, wherein the base comprises a length and a width, wherein each side panel of the plurality of side panels comprises a height and a width, wherein the length of the base is greater than the height of the side panels, and wherein the width of the base is greater than the width of the side panels.

Illustration 6. The collapsible maintenance cart of any preceding or subsequent illustrations or combination of illustrations, wherein, in the working configuration, the side panels extend vertically relative to the base, and wherein, in the stowed configuration, the side panels extend horizontally relative to the base.

Illustration 7. The collapsible maintenance cart of any preceding or subsequent illustrations or combination of illustrations, wherein each side panel of the plurality of side panels is rigid or semi-rigid.

Illustration 8. A maintenance cart comprising: a base defining a receiving area and comprising a channel within the receiving area; and a plurality of side panels, each side panel of the plurality of side panels comprising a panel body and a bottom frame supporting the panel body, wherein the bottom frame of at least one side panel of the plurality of panels is removably positioned within the channel.

Illustration 9. The maintenance cart of any preceding or subsequent illustrations or combination of illustrations, wherein the base further comprises: a perimeter wall defining the receiving area for the base; and a channel wall within the receiving area, wherein the channel wall and a portion of the perimeter wall define the channel within the receiving area.

Illustration 10. The maintenance cart of any preceding or subsequent illustrations or combination of illustrations, wherein each side panel of the plurality of side panels is rigid or semi-rigid, and wherein the maintenance cart is collapsible.

Illustration 11. The maintenance cart of any preceding or subsequent illustrations or combination of illustrations, wherein the base and the plurality of side panels define a lower structure of the maintenance cart, wherein the maintenance cart further comprises an upper structure, wherein the maintenance cart comprises a stowed configuration and a working configuration, wherein: in the working configuration, the lower structure and the upper structure together define an interior workspace and the upper structure is movable relative to the lower structure such that the maintenance cart comprises a raised position and a lowered position; and in the stowed configuration, a height of the maintenance cart in the stowed configuration is less than ½ a height of the maintenance cart in the lowered position of the working configuration.

Illustration 12. The maintenance cart of any preceding or subsequent illustrations or combination of illustrations, wherein the base further comprises a fastening mechanism configured to engage the at least one side panel within the channel and connect the at least one side panel to the base.

Illustration 13. The maintenance cart of any preceding or subsequent illustrations or combination of illustrations, wherein the fastening mechanism comprises side-sliding bracket within the receiving area, wherein the side-sliding bracket is slidable relative to the base and comprises a bracket base and an insert vertically offset and extending outwards from the bracket base, and wherein the insert is configured to engage the channel wall and the bottom frame within the channel.

Illustration 14. The maintenance cart of any preceding or subsequent illustrations or combination of illustrations, wherein the base further comprises a fastening mechanism configured to engage a bottom frame of at least one side panel that is not within the channel and connect the at least one side panel that is not within the channel to the base.

Illustration 15. The maintenance cart of any preceding or subsequent illustrations or combination of illustrations, wherein the fastening mechanism comprises an end-sliding bracket within the receiving area, wherein the end-sliding bracket is slidable relative to the base and comprises an insert extending upwards from the base, and wherein the insert engages a bottom frame of at least one side panel that is not within the channel.

Illustration 16. A maintenance cart comprising: a base defining a receiving area and comprising a fastening mechanism at least partially within the receiving area; and a plurality of side panels, each side panel of the plurality of side panels comprising a panel body and a bottom frame supporting the panel body, wherein the fastening mechanism selectively engages the bottom frame of at least one side panel of the plurality of side panels within the receiving area and selectively connects the at least one side panel of the plurality of side panels to the base.

Illustration 17. The maintenance cart of any preceding or subsequent illustrations or combination of illustrations, wherein the fastening mechanism is movable relative to the base within the receiving area.

Illustration 18. The maintenance cart of any preceding or subsequent illustrations or combination of illustrations, wherein the fastening mechanism is selectively attachable to or detachable from the bottom frame of the at least one side panel.

Illustration 19. The maintenance cart of any preceding or subsequent illustrations or combination of illustrations, wherein the base further comprises a perimeter wall defining the receiving area for the base.

Illustration 20. The maintenance cart of any preceding or subsequent illustrations or combination of illustrations, wherein the fastening mechanism comprises a bracket within the receiving area.

Illustration 21. The maintenance cart of any preceding or subsequent illustrations or combination of illustrations, wherein the bracket is an end-sliding bracket within the receiving area, wherein the end-sliding bracket is slidable relative to the base and comprises an insert extending upwards from the base, wherein the bottom frame of at least one side panel of the plurality of side panels comprises a groove, and wherein the at least one side panel is positioned in the receiving area such that the insert is positioned within the groove.

Illustration 22. The maintenance cart of any preceding or subsequent illustrations or combination of illustrations, wherein the bottom frame comprises a bottom groove and a side groove, and wherein the fastening mechanism engages the bottom groove.

Illustration 23. The maintenance cart of any preceding or subsequent illustrations or combination of illustrations, wherein each side panel of the plurality of side panels is rigid or semi-rigid, and wherein the maintenance cart is collapsible.

Illustration 24. A maintenance cart comprising: a base defining a receiving area and comprising a fastening mechanism within the receiving area, wherein the fastening mechanism is movable relative to the base within the receiving area, and a plurality of side panels, each side panel of the plurality of side panels comprising a panel body and a bottom frame supporting the panel body, and wherein at least one side panel is positioned in the receiving area such that the fastening mechanism is movable relative to the bottom frame of at least one panel of the plurality of panels and selectively attachable to and detachable from the bottom frame of the at least one panel of the plurality of panels.

Illustration 25. The maintenance cart of any preceding or subsequent illustrations or combination of illustrations, wherein the base further comprises a perimeter wall defining the receiving area for the base, and wherein the fastening mechanism comprises a sliding bracket within the receiving area, wherein the sliding bracket is slidable relative to the base and comprises a bracket base and an insert vertically offset and extending outwards from the bracket base.

Illustration 26. The maintenance cart of any preceding or subsequent illustrations or combination of illustrations, wherein the bottom frame of the at least one side panel of the plurality of side panels comprises a groove, and wherein the at least one side panel is positioned in the receiving area such that the insert is positioned within the groove.

Illustration 27. The maintenance cart of any preceding or subsequent illustrations or combination of illustrations, wherein the bottom frame comprises a bottom groove and a side groove, and wherein the fastening mechanism engages the side groove.

Illustration 28. The maintenance cart of any preceding or subsequent illustrations or combination of illustrations, wherein the base further comprises a channel wall within the receiving area, wherein the channel wall and a portion of the perimeter wall defines a channel within the receiving area, wherein the bottom frame is removably positioned within the channel, and wherein the fastening mechanism extends through the channel wall and into the bottom frame.

Illustration 29. The maintenance cart of any preceding or subsequent illustrations or combination of illustrations, wherein the fastening mechanism comprises a sliding bracket with an insert, wherein the bottom frame of the at least one panel of the plurality of panels comprises a groove, and wherein the insert of the sliding bracket extends through the channel wall and into the groove of the bottom frame.

Illustration 30. The maintenance cart of any preceding or subsequent illustrations or combination of illustrations, wherein the channel wall is fixed relative to the base within the receiving area.

Illustration 31. The maintenance cart of any preceding or subsequent illustrations or combination of illustrations, wherein each side panel of the plurality of side panels is rigid or semi-rigid, and wherein the maintenance cart is collapsible.

Illustration 32. A collapsible maintenance cart comprising: an upper structure; and a lower structure comprising: a base comprising a first end, a second end opposite the first end, and a side extending between the first end and the second end, a first end panel at the first end and extending upwards from the base; a second end panel at the second end and extending upwards from the base; a side panel assembly along the side of the base and extending upwards from the base; and a top support bar opposite from the base and comprising a first end and a second end, wherein the first end of the top support bar comprises a first set of studs insertable into the first end panel and the side panel assembly, and wherein the second end of the top support bar comprises a second set of studs insertable into the second end panel and the side panel assembly, wherein the base, the first end panel, the second end panel, and the side panel assembly define a workspace of the maintenance cart, and wherein the upper structure is supported above the lower structure and is movable between a lowered position and a raised position relative to the lower structure.

Illustration 33. The maintenance cart of any preceding or subsequent illustrations or combination of illustrations, wherein the side panel assembly comprises a top frame comprising at least one side groove, and wherein the top support bar overlaps the top frame of the side panel assembly such that the at least one side groove is covered by the top support bar.

Illustration 34. The maintenance cart of any preceding or subsequent illustrations or combination of illustrations, wherein each of the first end panel, the second end panel, and the side panel assembly is rigid or semi-rigid.

Illustration 35. A collapsible maintenance cart comprising: an upper structure comprising: a frame defining a central aperture comprising a central axis; and a plurality of retractable brackets, each retractable bracket of the plurality of retractable brackets selectively movable within the frame, and each retractable bracket movable in a direction perpendicular to the central axis, and a lower structure comprising a base and a plurality of side panels, wherein the upper structure is supported above the lower structure and is movable relative to the lower structure between a raised position and a lowered position, and wherein the lower structure and upper structure together define a workspace of the maintenance cart.

Illustration 36. The collapsible maintenance cart of any preceding or subsequent illustrations or combination of illustrations, further comprising a plurality of structural members, each structural member of the plurality of structural members connecting the upper structure to the lower structure, wherein each retractable bracket of the plurality of retractable brackets of the upper structure is movable between a stowed position and a working position, and wherein, in the working position, each retractable bracket is configured to receive a portion of a corresponding structural member.

Illustration 37. The collapsible maintenance cart of any preceding or subsequent illustrations or combination of illustrations, wherein, in the stowed position, each retractable bracket is housed within the frame of the upper structure.

Illustration 38. A collapsible maintenance cart comprising: an upper structure; a lower structure comprising a base and a plurality of side panels; and at least one structural member connecting the upper structure to the lower structure, wherein the at least one structural member supports the upper structure above the lower structure and such that the upper structure is movable relative to the lower structure between a raised position and a lowered position, wherein the lower structure and the upper structure together define a workspace of the maintenance cart, and wherein the at least one structural member comprises: an adjustment post comprising a plurality of notches and a sliding groove connecting the plurality of notches, wherein at least one notch of the plurality of notches faces a first direction and at least one notch of the plurality of notches faces a second direction different from the first direction; and a sliding post movable within the adjustment post, wherein the sliding post comprises an adjustment knob extending through the adjustment post and slidable within the sliding groove of the adjustment post, wherein the adjustment knob is positionable within at least one notch of the plurality of notches based on a position of the upper structure relative to the lower structure.

Illustration 39. A collapsible maintenance cart comprising: a rigid-sided lower structure; and an upper structure, wherein the collapsible maintenance cart is movable between a stowed configuration and a working configuration, wherein, in the working configuration, the lower structure and the upper structure together define an interior workspace and the upper structure is movable relative to the lower structure such that the collapsible maintenance cart comprises a raised position and a lowered position, and wherein, in the stowed configuration, a height of the collapsible maintenance cart in the stowed configuration is less than ½ a height of the collapsible maintenance cart in the lowered position of the working configuration.

Illustration 40. A collapsible maintenance cart comprising: a lower structure comprising a plurality of panels; and an upper structure, wherein the collapsible maintenance cart is movable between a stowed configuration and a working configuration, wherein, in the working configuration, the plurality of panels extends in a first direction relative to the upper structure, and wherein, in the stowed configuration, the plurality of panels extends in a second direction perpendicular to the first direction.

Illustration 41. The collapsible maintenance cart of any preceding or subsequent illustrations or combination of illustrations, wherein the panels of the lower structure are nested in the stowed configuration.

Illustration 42. The collapsible maintenance cart of any preceding or subsequent illustrations or combination of illustrations, further comprising a base, wherein, in the stowed configuration, at least one of the panels of the plurality of panels is nested within the base.

Illustration 43. The collapsible maintenance cart of any preceding or subsequent illustrations or combination of illustrations, further comprising a side wall access panel assembly for providing access into the cart through a side assembly.

Illustration 44. A collapsible maintenance cart comprising: a lower structure comprising a plurality of panels, wherein at least one panel comprises a side wall access panel assembly, and an upper structure, wherein the side wall access panel assembly comprises a non-rigid material and is configured to provide selective access into the lower structure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element genetically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A maintenance cart comprising:
a base defining a receiving area and comprising a channel within the receiving area; and
a plurality of side panels, each side panel of the plurality of side panels comprising a panel body and a bottom frame supporting the panel body, wherein the bottom frame of at least one side panel of the plurality of panels is removably positioned within the channel,
wherein the base further comprises a fastening mechanism configured to engage the at least one side panel within the channel and connect the at least one side panel to the base, wherein the fastening mechanism comprises side-sliding bracket within the receiving area, wherein the side-sliding bracket is slidable relative to the base and comprises a bracket base and an insert vertically offset and extending outwards from the bracket base, and wherein the insert is configured to engage the channel wall and the bottom frame within the channel.

2. The maintenance cart of claim 1, wherein the base further comprises:
a perimeter wall defining the receiving area for the base; and
a channel wall within the receiving area, wherein the channel wall and a portion of the perimeter wall define the channel within the receiving area.

3. The maintenance cart of claim 1, wherein each side panel of the plurality of side panels is rigid or semi-rigid, and wherein the maintenance cart is collapsible.

4. The maintenance cart of claim 1, wherein the base and the plurality of side panels define a lower structure of the maintenance cart, wherein the maintenance cart further comprises an upper structure, wherein the maintenance cart comprises a stowed configuration and a working configuration, wherein:
in the working configuration, the lower structure and the upper structure together define an interior workspace and the upper structure is movable relative to the lower structure such that the maintenance cart comprises a raised position and a lowered position; and in the stowed configuration, a height of the maintenance cart in the stowed configuration is less than ½ a height of the maintenance cart in the lowered position of the working configuration.

5. The maintenance cart of claim 1, wherein the base further comprises a second fastening mechanism configured to engage a bottom frame of at least one side panel that is not within the channel and connect the at least one side panel that is not within the channel to the base.

6. A maintenance cart comprising:
a base defining a receiving area and comprising a channel within the receiving area; and
a plurality of side panels, each side panel of the plurality of side panels comprising a panel body and a bottom frame supporting the panel body, wherein the bottom frame of at least one side panel of the plurality of panels is removably positioned within the channel,
wherein the base further comprises a fastening mechanism configured to engage a bottom frame of at least one side panel that is not within the channel and connect the at least one side panel that is not within the channel to the base,
wherein the fastening mechanism comprises an end-sliding bracket within the receiving area, wherein the end-sliding bracket is slidable relative to the base and comprises an insert extending upwards from the base, and wherein the insert engages a bottom frame of at least one side panel that is not within the channel.

7. A maintenance cart comprising:
a base defining a receiving area and comprising a fastening mechanism at least partially within the receiving area; and
a plurality of side panels, each side panel of the plurality of side panels comprising a panel body and a bottom frame supporting the panel body, wherein the fastening mechanism selectively engages the bottom frame of at least one side panel of the plurality of side panels within the receiving area and selectively connects the at least one side panel of the plurality of side panels to the base,
wherein the fastening mechanism is movable relative to the base within the receiving area.

8. The maintenance cart of claim 7, wherein the fastening mechanism is selectively attachable to or detachable from the bottom frame of the at least one side panel.

9. The maintenance cart of claim 7, wherein the base further comprises a perimeter wall defining the receiving area for the base.

10. The maintenance cart of claim 7, wherein each side panel of the plurality of side panels is rigid or semi-rigid, and wherein the maintenance cart is collapsible.

* * * * *